US012778170B2

(12) United States Patent
Tsivion et al.

(10) Patent No.: US 12,778,170 B2
(45) Date of Patent: Nov. 3, 2026

(54) COATED SWEETENER PARTICLES

(71) Applicant: INCREDO LTD., Petah Tikva (IL)

(72) Inventors: David Tsivion, Kfar Shmaryahu (IL); Ido Rosenbaum, Raanana (IL); Yelena Rotman, Ramat Gan (IL); Lihi Ozery, Petah Tikva (IL)

(73) Assignee: INCREDO LTD., Petah Tikva (IL)

( * ) Notice: Subject to any disclaimer, the term of this patent is extended or adjusted under 35 U.S.C. 154(b) by 212 days.

(21) Appl. No.: 18/885,781

(22) Filed: Sep. 16, 2024

(65) Prior Publication Data

US 2025/0008997 A1 Jan. 9, 2025

Related U.S. Application Data

(63) Continuation of application No. PCT/IB2023/053304, filed on Apr. 2, 2023.

(60) Provisional application No. 63/329,429, filed on Apr. 10, 2022.

(51) Int. Cl.

*A23L 27/30* (2016.01)
*A23L 27/00* (2016.01)

(52) U.S. Cl.

CPC ............... *A23L 27/33* (2016.08); *A23L 27/77* (2016.08)

(58) Field of Classification Search

CPC ....... C13B 50/002; C13B 50/00; C13B 50/02; A21D 2/181; A23L 29/30; A23L 27/33; A23L 2/60; A23L 29/00; A23P 10/00
See application file for complete search history.

(56) References Cited

U.S. PATENT DOCUMENTS

2009/0297670 A1* 12/2009 Baniel ..................... A23L 27/77 977/775
2015/0297521 A1* 10/2015 To ........................ A61K 9/5089 424/490
2018/0055775 A1* 3/2018 Davé .................... A61K 9/2813
2019/0021381 A1* 1/2019 Baniel ....................... A23L 5/32

FOREIGN PATENT DOCUMENTS

DE 19503670 A1 * 8/1996 ........... A61K 9/2826

* cited by examiner

*Primary Examiner* — Vera Stulii
(74) *Attorney, Agent, or Firm* — Momentum IP Ltd.; Marc Van Dyke

(57) ABSTRACT

Sweetener formulations having silica-and-sweetener coated sweetener particles, and to methods for making such formulations and for utilizing them in food products.

20 Claims, 4 Drawing Sheets

FIG. 2
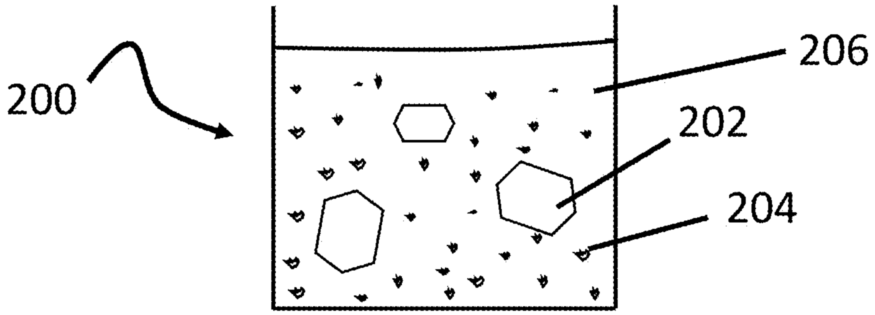
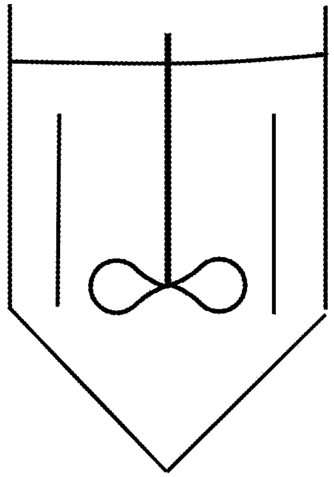
FIG. 3
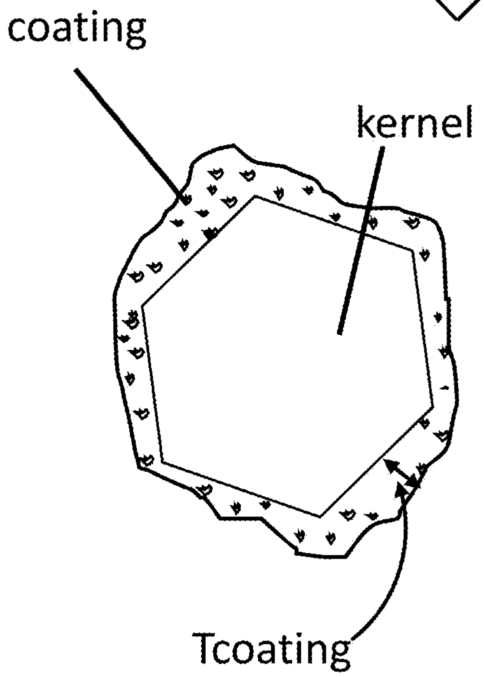
FIG. 4

COATED SWEETENER PARTICLES

RELATED APPLICATION INFORMATION

The present application is a continuation of PCT/IB2023/053304 filed on Apr. 2, 2023 which is incorporated herein by reference in its entirety.

FIELD AND BACKGROUND OF THE INVENTION

The present invention relates to sweetener formulations having silica-and-sweetener coated sweetener particles, and to methods for making such formulations and for utilizing them in food products.

SUMMARY OF THE INVENTION

According to aspects of the invention there is provided a method including: (a) providing a slurry containing solids disposed in an aqueous medium containing dissolved sweetener, the solids including silica particles and sweetener kernel particles; and (b) drying at least a portion of the solids to produce a dried sweetener product containing coated sweetener particles having a silica-and-sweetener coating enveloping the sweetener kernel particles.

According to further aspects of the invention there is provided a method including: (a) contacting sweetener particles with an aqueous medium containing dissolved sweetener and silica particles, to produce a slurry containing sweetener kernel particles and the silica particles in a sweetener solution; (b) separating off a first portion of the aqueous medium and a first portion of the silica particles from the sweetener kernel particles, and leaving a wet cake in which a second portion of the aqueous medium and a second portion of the silica particles are disposed around the sweetener kernel particles; and (c) drying the wet cake to produce a dried sweetener product containing coated particles having a silica-and-sweetener coating enveloping the sweetener kernel particles, the silica-and-sweetener coating including silica particles from the second portion of the silica particles; wherein the sweetener kernel particles optionally have an average particle size ($D_{50}$) of at least 100 micrometers; and wherein a concentration of the silica particles within the dried sweetener product, by weight, is optionally within the range of 0.02% to 5%.

According to further aspects of the invention there is provided a method including: (a) contacting sweetener particles with an aqueous medium containing dissolved sweetener and silica particles, to produce a slurry containing sweetener kernel particles and the silica particles in a sweetener solution; (b) separating off a first portion of the aqueous medium and a first portion of the silica particles from the sweetener kernel particles, and leaving a wet cake in which a second portion of the aqueous medium and a second portion of the silica particles are disposed around the sweetener kernel particles; and (c) drying the wet cake to produce a dried sweetener product containing coated particles having a silica-and-sweetener coating enveloping the sweetener kernel particles, the silica-and-sweetener coating including silica particles from the second portion of the silica particles; wherein the sweetener kernel particles have an average particle size ($D_{50}$) of at least 100 micrometers; and wherein a concentration of the silica particles within the dried sweetener product, by weight, is within the range of 0.02% to 5%.

According to further aspects of the invention there is provided a method including: (a) providing a slurry containing silica particles and sweetener kernel particles in an aqueous medium containing dissolved sweetener; and (b) crystallizing at least a portion of the dissolved sweetener in the aqueous medium onto the sweetener kernel particles to produce a sweetener product in a mother liquor, the sweetener product containing coated sweetener particles having a sweetener coating enveloping the sweetener kernel particles, the sweetener coating including at least a portion of the silica particles.

According to further aspects of the invention there is provided a method including: (a) providing a slurry containing silica particles and sweetener kernel particles in an aqueous medium containing dissolved sweetener; the silica particles optionally having an average particle size (D50) within the range of 1 to 20 micrometers; and (b) depositing at least a portion of the dissolved sweetener in the aqueous medium onto the sweetener kernel particles to produce a sweetener product, the sweetener product containing coated sweetener particles having a sweetener-coating enveloping the sweetener kernel particles, the sweetener coating including at least a portion of the silica particles; wherein a weight ratio of the sweetener kernel particles to the sweetener product is within the range of 55% to 95%;

and wherein a weight ratio of the silica particles to the sweetener product is within the range of 0.02% to 5%.

According to further aspects of the invention there is provided at least one of a formulation, a sweetener formulation, or an edible formulation including coated sweetener particles, each sweetener particle of at least a portion of the sweetener particles having: (a) a sweetener core; (b) a sweetener coating at least partially enveloping the sweetener core; and (c) silica particles disposed at least within the sweetener coating; wherein the first concentration or average concentration of the silica particles within the sweetener coating is $C_{SIL\text{-}shell}$; wherein the second concentration or average concentration of the silica particles within the sweetener core is $C_{SIL\text{-}core}$; and wherein $C_{SIL\text{-}shell} > C_{SIL\text{-}core}$.

According to further aspects of the invention there is provided at least one of a formulation, a sweetener formulation, and an edible formulation including coated sweetener particles, each sweetener particle of at least a portion of the sweetener particles having: (a) a sweetener core; (b) a sweetener coating at least partially enveloping the sweetener core; and (c) silica particles disposed at least within the sweetener coating; wherein $C_{SIL\text{-}shell}$ is a first average concentration of the silica particles disposed in an outermost layer of the sweetener coating; wherein $C_{SIL\text{-}core}$ is a second average concentration of the silica particles disposed in the coated sweetener particles, radially inward with respect to the outermost layer; and wherein $C_{SIL\text{-}shell} > C_{SIL\text{-}core}$.

According to further aspects of the invention there is provided at least one of a formulation, a sweetener formulation, or an edible formulation including coated sugar particles, each sugar particle of at least a portion of the sugar particles having: (a) a sugar core; (b) a sugar coating at least partially enveloping the sugar core; and (c) silica particles disposed at least within the sugar coating; wherein the first concentration or average concentration of the silica particles within the sugar coating is $C_{SIL\text{-}shell}$; wherein the second concentration or average concentration of the silica particles within the sugar core is $C_{SIL\text{-}core}$; and wherein $C_{SIL\text{-}shell} > C_{SIL\text{-}core}$.

According to further aspects of the invention there is provided at least one of a formulation, a sweetener formulation, or an edible formulation including coated sugar particles, each sugar particle of at least a portion of the sugar particles having: (a) a sugar core; (b) a sugar coating at least partially enveloping the sugar core; and (c) silica particles disposed at least within the sugar coating; wherein $C_{SIL\text{-}shell}$ is a first average concentration of the silica particles disposed in an outermost layer of the sugar coating; wherein $C_{SIL\text{-}core}$ is a second average concentration of the silica particles disposed in the coated sugar particles, radially inward with respect to the outermost layer; and wherein $C_{SIL\text{-}shell}>C_{SIL\text{-}core}$.

According to further features of the invention there is provided an edible formulation including: (a) a sweetener including the coated sweetener (e.g., sugar) particles of any one of the above-provided formulations; (b) at least one fat; and (c) optionally, at least one starch.

According to further features of the invention there is provided an edible formulation including: (a) a sweetener including the coated sweetener (e.g., sugar) particles of any one of the above-provided formulations; (b) at least one fat; (c) optionally, at least one starch; and (d) optionally, at least one edible filler.

According to further features of the invention, a total concentration of the sweetener, the at least fat, and the at least one starch, within the edible formulation, is at least 30%, on a weight basis.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only.

In the drawings:

FIG. 2 is a schematic representation of a slurry of sweetener particles and silica particles disposed in a concentrated sweetener solution, according to embodiments of the methods of the present invention;

FIG. 3 is a schematic representation of an exemplary crystallizer for effecting step 104, according to embodiments of the inventive method;

FIG. 4 is a schematic representation of a silica-and-sweetener coated sweetener particle (e.g., a coated sugar particle) according to embodiments of the present invention;

DESCRIPTION OF THE PREFERRED EMBODIMENTS

The present disclosure describes silica-and-sweetener coated sweetener formulations and methods for making such formulations and for utilizing them in food products. The kernel of the sugar-coated particles in such formulations is a sweetener kernel including at least one of a sweetener carbohydrate (e.g., sucrose) and a sweetener polyol. The coating enveloping the kernel includes silica and a sweetener—typically sugar.

Figure 1:
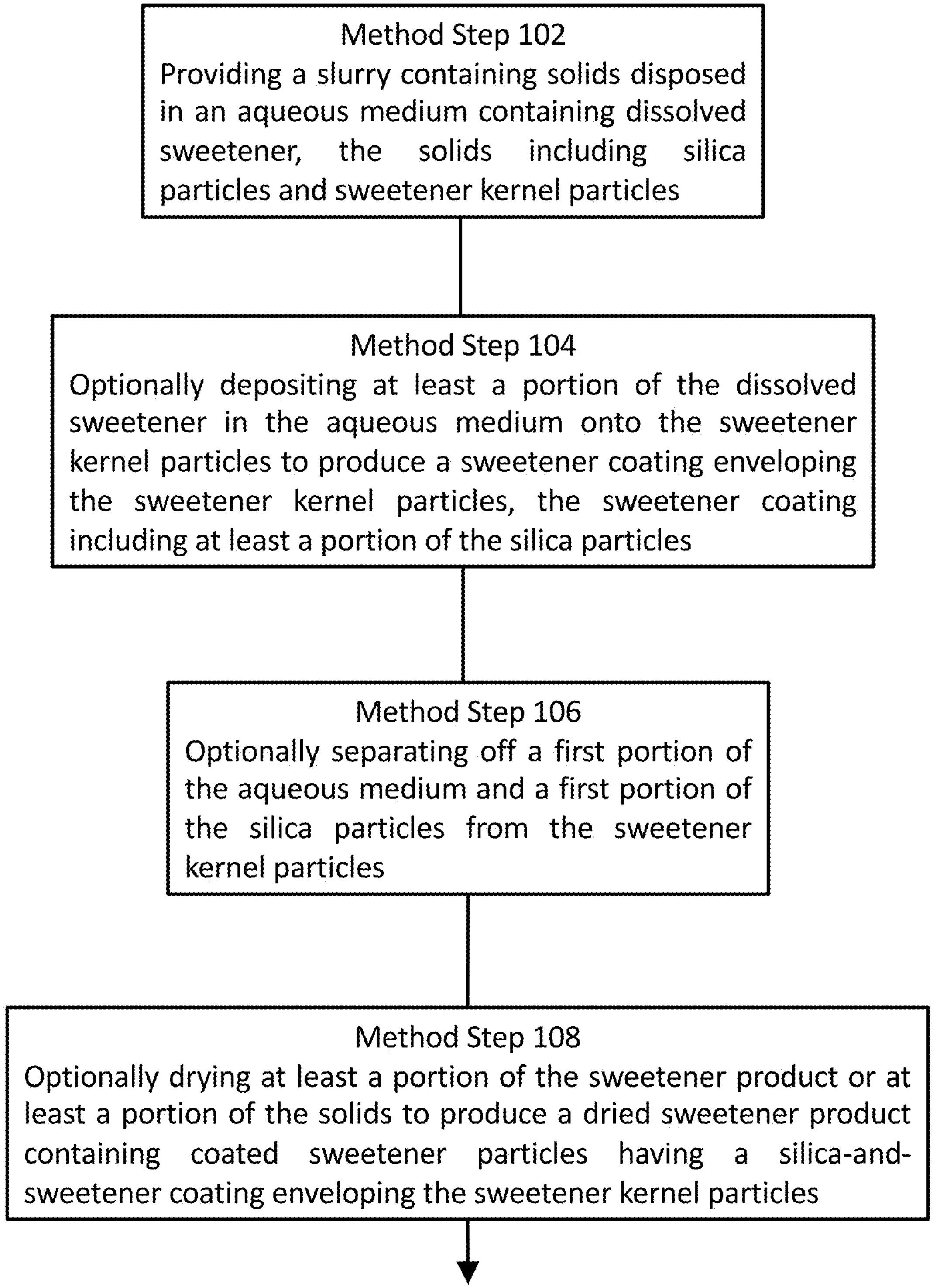
FIG. 1 is a block diagram of a method of producing silica-and-sweetener coated sweetener particles, according to embodiments of the present invention.

FIG. 1 is a block diagram of a method of producing silica-and-sweetener coated sweetener particles, according to embodiments of the present invention. Step 102 of the method includes providing a slurry containing solids disposed in an aqueous medium containing dissolved sweetener, the solids including silica particles and sweetener kernel particles.

In some embodiments, step 102 of the method may include contacting sweetener particles with an aqueous medium containing dissolved sweetener and silica particles, to produce a slurry containing sweetener kernel particles and silica particles in a sweetener solution ("concentrated sweetener solution" or "concentrated sugar solution").

FIG. 2 provides a schematic representation of such a slurry 200, in which sweetener kernel particles 202 and silica particles 204 are in contact with an aqueous sweetener solution 206. It will be appreciated that aqueous sweetener solution 206 may be saturated or substantially saturated with respect to the sweetener.

Typically, the sweetener is a sugar, such as sucrose. In the general process description provided below, the term "sugar" is meant to refer to the more general case, i.e., "sweetener".

Step 104 of the method may include depositing at least a portion of the dissolved sweetener in the aqueous medium onto the sweetener kernel particles to produce a sweetener coating enveloping the sweetener kernel particles, the sweetener coating including at least a portion of the silica particles. Step 104, which is optional, may be performed in a crystallizer, such as a cooling crystallizer, a flash-cooling crystallizer, or an evaporative crystallizer. Forced circulation crystallizers, draft-tube crystallizers, Oslo-type crystallizers, and other types of crystallizers may be employed.

Step 106 of the method includes optionally separating off a first portion of the aqueous medium (e.g., from step 102 or step 104) and a first portion of the silica particles from the sugar kernel particles. As a result, a wet cake may be produced, in which a second portion of the aqueous medium and a second portion of the silica particles are disposed around the sugar kernel particles.

Step 108 of the method includes optionally drying at least a portion of the sweetener product or at least a portion of the solids (e.g., from any of step 102, step 104, and/or step 106) to produce a dried sweetener product containing coated sweetener particles having a silica-and-sweetener coating enveloping the sweetener kernel particles. The sugar-and-silica coating may include silica particles from the second portion of the silica particles.

Both batch processing and continuous processing may be utilized in the inventive method.

FIG. 3 is a schematic representation of an exemplary crystallizer for effecting step 104 according to embodiments of the inventive method.

FIG. 4 is a schematic representation of a coated sweetener particle according to embodiments of the present invention. The coated sweetener particle consists of a central kernel having a radius or characteristic radius $R_{kernel}$, the core enveloped or at least partially enveloped by a coating having a characteristic thickness $T_{coating}$. Since the kernel is typically a pure sugar or sweetener, the kernel may be (i.e., is typically) devoid or substantially devoid of silica. It is manifest that the average weight concentration of silica within the coating, $C_{SIL\text{-}coating}$, is greater than the average weight concentration of silica within the coating, $C_{SIL\text{-}kernel}$:

$$C_{SIL\text{-}coating} > C_{SIL\text{-}kernel}$$

The ratio $C_{SIL\text{-}kernel}/C_{SIL\text{-}coating}$ may be at most 0.2, and more typically, at most 0.1, at most 0.05, or at most 0.02. Most typically, $C_{SIL\text{-}kernel}/C_{SIL\text{-}coating}$ may be 0 or substantially 0.

It will be appreciated by those of skill in the art that various analytical techniques may be used to characterize the outer layer or coating of the coated sweetener particles, and to compare the characteristics with those of the material underlying the coating.

In some embodiments, a weight ratio of the sweetener kernel or sweetener kernel particles to the sweetener product is within the range of 55% to 95%.

In some embodiments, a weight ratio of the silica particles to the sweetener product is within the range of 0.02% to 5%.

In some embodiments, a weight ratio of the sweetener kernel particles to the sweetener product is within the range of 55% to 95%, and a weight ratio of the silica particles to the sweetener product is within the range of 0.02% to 5%.

In some embodiments, a weight ratio of the sweetener coating (i.e., including both the sweetener and the silica) to the sweetener product is within the range of 5% to 45%.

In some embodiments, a weight ratio of the silica particles to the sweetener product is within the range of 0.02% to 5%.

In some embodiments, a weight ratio of the sweetener coating to the sweetener product is within the range of 5% to 45%, and a weight ratio of the silica particles to the sweetener product is within the range of 0.02% to 5%.

In some embodiments, the silica particles utilized have an average particle size D50 (i.e., at least one of, and typically both of $D_V50$ and $D_N50$) of at most 30 micrometers (μm), at most 20 μm, at most 15 μm, at most 10 μm, at most 7 μm, or at most 5 μm.

In some embodiments, the silica particles utilized have an average particle size (D50) within the range of 0.5 to 30 μm, 0.5 to 20 μm, 0.5 to 10 μm, 0.5 to 7 μm, 0.5 to 5 μm, 1 to 25 μm, 1 to 20 μm, 2 to 20 μm, 3 to 20 μm, 1 to 15 μm, 2 to 15 μm, 1 to 10 μm, 2 to 10 μm, 1 to 7 μm, or 1 to 5 μm.

EXAMPLES

Reference is now made to the following examples, which together with the above descriptions, illustrate the invention in a non-limiting fashion.

Typically, the sweetener is a sugar, such as sucrose. In the general procedures description provided below, the term "sugar" is meant to refer to sugar, and in addition, to the more general case, i.e., "sweetener".

EQUIPMENT

| Instruments | Manufacturer | Model | Operating/ Measuring range | Units | Misc. |
|---|---|---|---|---|---|
| High shear mixer | IKA | IKA T 25 ULTRA-TURRAX ® | 3000-25000 | rpm | |
| | Silverson | L5M-A | 0-8000 | rpm | |
| Thermomix ® | MRC Ltd Vorwerk | DFO-150TM5-1 | 25-250 | ° C. | |
| Ultra centrifugal mill | Retsch ® | ZM200 | 50 | Hz | |
| Pocket Refractometer | ATAGO ® | PAL-BX/RI | 0.0-93.0 | % | |
| Fluidized bed dryer | Retsch ® | TG 100 | | | |
| Centrifuge | MRC | BK-30 | | | |
| Confocal microscope | Leica | TCS SP8 | | | |

MATERIALS

| Material | Manufacturer | Type | Average Particle Size (micrometers) | Specific Surface Area ($m^2/g$) |
|---|---|---|---|---|
| Silica | Grace | Grace Syloid ® 9005 | 4.5-5.3 | 300 |
| | Flo-gard ™ | T-700 | 4 | |
| | | T-800 | 2.5 | |
| | | 915 | | |
| | | 233 | | |
| Inulin | Beneo | Orafti Highly Soluble Inulin | | |
| | Cosucra | Fibruline | | |
| | Sensus | Frutafit CLR | | |
| Sugar | Sugat ® | White sugar EU 2 | 400-1000 | 0.009 |

Example 1

A concentrated sugar syrup, typically containing about 60 to 75 wt % sugar, is prepared, typically at around 60° C. to 70° C. in a Thermomix® cooker-mixer. The solution density, in Brix, may be measured using an ATAGO® pocket refractometer. Sugar is then added, incrementally, under constant mixing to produce a slurry containing sugar particles. The sugar may be pre-classified (e.g., by sieving) to obtain a particular fraction or size distribution. Food-grade silica is then added incrementally, under constant mixing, to produce a slurry of sugar and silica particles in a substantially saturated sugar solution.

Example 2

Under constant mixing, sugar is added to water (or an unsaturated sugar solution) in the Thermomix® cooker-mixer, to produce a concentrated sugar solution or sugar slurry that may be substantially saturated with respect to sugar (typically containing 90% to 95% of the amount sugar required to achieve saturation at that particular temperature). Alternatively, a substantially saturated solution is produced as follows: sugar is added in a 15% to 30% excess with respect to the requisite amount to achieve saturation at the target temperature. After 1 hour of mixing, a solid/liquid separation is performed (typically in a heated filtration unit) to separate off the excess sugar solids, leaving a clear, substantially saturated solution.

Food-grade silica is added incrementally, under constant mixing.

Sugar is then added incrementally, under constant mixing, to produce a slurry containing sugar particles and silica. This sugar may be pre-classified (e.g., by sieving) to obtain a particular fraction or size distribution for introducing to the syrup. Typically, the temperature of the crystallizer contents is maintained at 60° C.

Example 3

Under constant mixing, sugar is added to water in the Thermomix® cooker-mixer, to produce a solution substantially saturated with respect to sugar. Food-grade silica may be incrementally added to the water or sugar solution, under constant mixing. The addition of the silica may be prior to, concurrently with, or at least partially concurrently with the addition of the sugar. To the sugar solution containing the silica, sugar is added incrementally, under constant mixing, to produce a slurry containing sugar particles and silica. This sugar may be pre-classified (e.g., by sieving) to obtain a particular fraction or size distribution.

Example 4

Cooling Crystallization to Produce Coated Sugar Kernel Particles

The crystallizer is filled with a slurry containing sugar and food-grade silica in a concentrated syrup of sugar, e.g., as prepared according to any of Examples 1-3, the slurry being maintained at a temperature within the range of 60-80° C. under constant mixing using an IKA high-shear mixer. The crystallizer is then cooled, typically to 25-45° C., by means of the heat transfer fluid disposed within the jacket of the crystallizer. During the cooling, which usually takes about 2 hours, the saturation concentration of the sugar decreases, and the supersaturation yields a coating of sugar and silica on top of the pure sugar kernels.

Example 5

Evaporative Cooling Crystallization to Produce Coated Sugar Kernel Particles

The crystallizer is filled with a slurry containing sugar and silica in a concentrated syrup of sugar, e.g., as prepared according to any of Examples 1-3, the slurry being maintained at a temperature within the range of 60-80° C. under constant mixing using the IKA High shear mixer for about 20 minutes. A vacuum is then applied so as to cool the crystallizer to 25-45° C., and to maintain the crystallizer at this temperature. During the cooling, which usually takes about 2 hours, the saturation concentration of the sugar decreases, and the supersaturation yields a coating of sugar and silica on top of the pure sugar kernels. It will be appreciated that for higher initial temperatures of the slurry, and/or for lower cooling temperatures within the crystallizer, the weight ratio of coating to kernel is increased.

Example 6

Evaporative Crystallization to Produce Coated Sugar Kernel Particles

The crystallizer is filled with a slurry containing sugar and silica in a concentrated syrup of sugar, e.g., as prepared according to any of Examples 1-3, the slurry being maintained at a temperature within the range of 60-80° C. under constant mixing using IKA High shear mixer for about 20 minutes. A vacuum is then applied so as to evaporate water from the system while maintaining the temperature within the range of 60-80° C. The supersaturation produced yields a coating of sugar and silica on top of the pure sugar kernels.

Example 7

Solid/Liquid Separation

Subsequent to the crystallization step (according to any of Examples 4-6), the slurry is immediately transferred to a filtering apparatus such as a belt filter or a centrifuge (e.g., MRC model BK-30), typically operating at room temperature. The centrifuge separates the filtrate from the coated sugar to yield a wet sugar cake containing the coated sugar particles. It will be appreciated that the time of centrifugation may be varied to obtain a pre-determined or desirable level of moisture, with higher centrifugation times (and/or higher centrifugal force) being associated with lower ratios of coating weight to kernel weight or coating thickness to kernel size (radius or diameter).

Example 8

Solid/Liquid Separation

Subsequent to the production of the slurry containing sugar and silica particles in a concentrated solution of sugar (e.g., according to any of Examples 1-3), the slurry is immediately transferred into a filtering apparatus such as a belt filter or a centrifuge (e.g., MRC model BK-30), typically operating at room temperature. The filtering apparatus separates the filtrate from the sugar particles to yield a wet sugar cake containing the sugar particles (surrounded by a layer of mother liquor). It will be appreciated that the time of filtration or centrifugation may be varied to obtain a pre-determined or desirable level of moisture, with higher centrifugation times (and/or higher centrifugal force) being associated with lower ratios of coating weight to kernel weight or coating thickness to kernel size.

Example 9

Production of a Dry Coated Sugar Powder

The coated sugar produced (e.g., by the method of Example 7 or Example 8) is transferred into a fluidized bed drier (Retsch® TG 100). The drying program is typically performed as follows: 2 minutes at temperature 4, with the blower on level 3; 2 minutes at temperature 5, with the blower on level 4; and 2 minutes at temperature 6, with the blower on level 4.

Example 9A

Production of a Diluted Coated Sugar Powder

The dry coated sugar produced (e.g., by the method of Example 9) may be diluted (including mixed) with a sugar having a lower concentration of silica, typically food-grade sugar such as table sugar, to produce a sweetener product containing silica- and-sugar coated sweetener particles diluted by other sweetener particles.

Example 10

A concentrated sugar syrup was prepared at 60° C. by mixing 726 g of Sugat® sugar (food-grade sucrose) with 210 g of water, and subsequently filtering, according to Example 2, to produce a substantially saturated sugar solution containing about 605 g of sugar. An additional quantity of the sugar was sieved to obtain the 500-600 μm fraction, the other fractions being discarded. 600 g of the sieved sugar (~500-600 μm fraction) was added incrementally to the crystallizer over several minutes, under constant mixing. Subsequently, 6.0 g of the silica (Syloid® 9005 PC) was incrementally added over 30 seconds, again under constant mixing. This amount represents 0.5% by weight of pure silica with respect to the total amount of sugar in the process (i.e.,—in the syrup+sieved sugar).

Cooling crystallization was then effected according to the procedure delineated in Example 4. The initial temperature of the slurry was about 70° C. The crystallizer was cooled to about 30° C., by means of the heat transfer fluid disposed within the jacket of the crystallizer, to produce the coated sugar kernel particles. The solid/liquid separation was performed according to Example 7, with a centrifugation time of 40 seconds. Drying of the silica-and-sugar coated sugar was performed by means of a fluidized bed drier, according to the procedure provided in Example 9. The concentration of pure silica with respect to the concentration of sugar within the coated sugar particles was approximately 0.14%.

Example 11

A concentrated sugar syrup was prepared at 60° C. according to Example 10. An additional quantity of the sugar was sieved to obtain the 500-600 μm fraction, the other fractions being discarded. 600 g of the sieved sugar (500-600 μm fraction) was added incrementally to the crystallizer over 1 minute, under constant mixing. Subsequently, 3.0 g of the silica (Syloid® 9005) was incrementally added over 30 seconds, again under constant mixing. This amount represents 0.25% by weight of pure silica with respect to the total amount of sugar in the process (i.e.,—in the syrup+sieved sugar).

Cooling crystallization was then effected according to the procedure delineated in Example 4. The initial temperature of the slurry was about 60° C. The crystallizer was cooled to about 30° C., by means of the heat transfer fluid disposed within the jacket of the crystallizer, to produce the coated sugar kernel particles. The solid/liquid separation was performed according to Example 7, with a centrifugation time of 40 seconds. Drying of the silica-and-sugar coated sugar was performed by means of a fluidized bed drier, according to the procedure provided in Example 9. The concentration of pure silica with respect to the concentration of sugar within the coated sugar particles was approximately 0.06%.

Example 12

A concentrated sugar syrup was prepared at 60° C. according to Example 10. An additional quantity of the sugar was sieved to obtain the 500-600 μm fraction, the other fractions being discarded. 600 g of the sieved sugar (500-600 μm fraction) was added incrementally to the crystallizer over 1 minute, under constant mixing. Subsequently, 6.0 g of the silica (T-700) was incrementally added over 30 seconds, again under constant mixing. This amount represents 0.5% by weight of pure silica with respect to the total amount of sugar in the process (i.e.,—in the syrup+sieved sugar).

Evaporative cooling crystallization was then effected according to the procedure delineated in Example 5. The initial temperature of the slurry was about 60° C. The crystallizer was cooled to about 30° C., by means of vacuum, to produce the coated sugar kernel particles. The solid/liquid separation was performed according to Example 7, with a centrifugation time of 40 seconds. Drying of the silica-and-sugar coated sugar was performed by means of a fluidized bed drier, according to the procedure provided in Example 9.

The dried silica-and-sugar coated sugar product weighed 729 g, representing an increase of 124 g (729 g-605 g) or 20.5% with respect to the weight of the sugar kernels, and 17% (124 g/729 g) with respect to the entirety of the coated sugar particles. The silica content of the dried silica-and-sugar coated sugar product was 1.2 grams, all of which was disposed in the coating. Thus, the average silica concentration within the coating was 1.2 g/124 g, or about 1.0%, and the average silica:sugar weight ratio within the coating was 1.2 g/122.8 g, or about 0.01. The average concentration of silica with respect to the concentration of sugar within the entirety of the coated sugar particles was 1.2 g/729 g, or about 0.16%, and the average silica:sugar weight ratio within the entirety of the coated sugar particles was 1.2 g/727.8 g, or about 0.0016.

Example 13

A concentrated sugar syrup was prepared at 60° C. according to Example 10. An additional quantity of the sugar was sieved to obtain the 500-600 μm fraction, the other fractions being discarded. 600 g of the sieved sugar (500-600 μm fraction) was added incrementally to the crystallizer over 1 minute, under constant mixing. Subsequently, 2.0 g of the silica (Syloid® 9005) was incrementally added over 30 seconds, again under constant mixing. This amount represents about 0.17% by weight of pure silica with respect to the total amount of sugar in the process (i.e.,—in the syrup+sieved sugar).

Cooling crystallization was then effected according to the procedure delineated in Example 4. The initial temperature of the slurry was about 70° C. The crystallizer was cooled to about 30° C., by means of the heat transfer fluid disposed within the jacket of the crystallizer, to produce the coated sugar kernel particles. The solid/liquid separation was performed according to Example 7, with a centrifugation time of 40 seconds. Drying of the silica-and-sugar coated sugar was performed by means of a fluidized bed drier, according to the procedure provided in Example 9.

The weight of the coating, which consisted of sugar and sweetener, was about 123 grams, or about 17% with respect to the original weight of the sugar kernel. The amount of pure silica within the coated layer was 0.36 grams, corresponding to about 0.29% (0.36/123) of the coating, which is the average concentration (by weight) on a silica to sweetener (sugar) basis, within the coating. The concentration of pure silica with respect to the concentration of sugar within the coated sugar particles, i.e., the average concentration, by weight, on a silica to sweetener (sugar) basis was 0.05%.

This is approximately equal to the average concentration (by weight) of silica in the coated particles, which was also about 0.05%.

The silica-and-sugar coated sugar was then diluted by adding Sugat® table sugar in a 1:1 ratio (Sugat®:coated sugar). This lowered the concentration of pure silica with respect to the concentration of sugar within the sugar formulation to 0.025%.

Example 14

A concentrated sugar syrup was prepared at 60° C. according to Example 10. An additional quantity of the sugar was sieved to obtain the 500-600 μm fraction, the other fractions being discarded. 600 g of the sieved sugar (500-

600 μm fraction) was added incrementally to the crystallizer over 1 minute, under constant mixing. Subsequently, 4.0 g of the silica (Flo-gard™ T-800) was incrementally added over 30 seconds, again under constant mixing. This amount represents 0.33% by weight of pure silica with respect to the total amount of sugar in the process (i.e.,—in the syrup+sieved sugar).

Evaporative cooling crystallization was then effected according to the procedure delineated in Example 5. The initial temperature of the slurry was about 60° C. The crystallizer was cooled to about 30° C., by means of vacuum, to produce the coated sugar kernel particles. The solid/liquid separation was performed according to Example 7, with a centrifugation time of 40 seconds. Drying of the silica-and-sugar coated sugar was performed by means of a fluidized bed drier, according to the procedure provided in Example 9. The concentration of pure silica with respect to the concentration of sugar within the coated sugar particles was approximately 0.1%.

Example 15A

A concentrated sugar syrup was prepared at 60° C. according to Example 10. An additional quantity of the sugar was sieved to obtain the 500-600 μm fraction, the other fractions being discarded. 600 g of the sieved sugar (500-600 μm fraction) was added incrementally to the crystallizer over 1 minute, under constant mixing. Subsequently, 5.0 g of the silica (Flo-gard™ 915) was incrementally added over 30 seconds, again under constant mixing. This amount represents about 0.41% by weight of pure silica with respect to the total amount of sugar in the process (i.e.,—in the syrup+sieved sugar).

Cooling crystallization was then effected according to the procedure delineated in Example 4. The initial temperature of the slurry was about 60° C. The crystallizer was cooled to about 30° C., by means of the heat transfer fluid disposed within the jacket of the crystallizer, to produce silica-and-sugar coated sugar kernel particles. The solid/liquid separation was performed according to Example 7, with a centrifugation time of 40 seconds. Drying of the silica-and-sugar coated sugar was performed by means of a fluidized bed drier, according to the procedure provided in Example 9. The weight of the coating, which consisted of sugar and sweetener, was about 138 grams, or about 23% with respect to the original weight of the sugar kernel. The amount of pure silica within the coated layer was approximately 0.72 grams, corresponding to an average concentration of about 0.52% of the coating, by weight. The average concentration of pure silica with respect to the average concentration of sugar within the coated sugar particles (i.e., average concentration, on a silica to sugar basis) was approximately 0.1%.

The silica-and-sugar coated sugar was then diluted by a factor of 2 by adding Sugat® table sugar in a 1:1 ratio (Sugat®:coated sugar). This lowered the average concentration of pure silica with respect to the average concentration of sugar within the sugar formulation to about 0.05%.

Example 15B

A concentrated sugar syrup was prepared at 60° C. according to Example 10. An additional quantity of the sugar was sieved to obtain the 500-600 μm fraction, the other fractions being discarded. 600 g of the sieved sugar (500-600 μm fraction) was added incrementally to the crystallizer over 1 minute, under constant mixing. Subsequently, 20 g of the silica (Flo-gard™ 915) was incrementally added over 30 seconds, again under constant mixing. This amount represents 1.66% by weight of pure silica with respect to the total amount of sugar in the process (i.e.,—in the syrup+sieved sugar).

Cooling crystallization was then effected according to the procedure delineated in Example 4. The initial temperature of the slurry was about 70° C. The crystallizer was cooled to about 30° C., by means of the heat transfer fluid disposed within the jacket of the crystallizer, to produce silica-and-sugar coated sugar kernel particles. The solid/liquid separation was performed according to Example 7, with a centrifugation time of 40 seconds. Drying of the silica-and-sugar coated sugar was performed by means of a fluidized bed drier, according to the procedure provided in Example 9. The weight of the coating was about 126 grams, or about 21% with respect to the original weight of the sugar kernel. The amount of pure silica within the coated layer was approximately 4.8 grams, corresponding to about 4.0% of the coating (silica:sugar), by weight. The average concentration of pure silica with respect to the average concentration of sugar within the coated sugar particles (i.e., average concentration on a silica to sugar basis) was approximately 0.66%.

The silica-and-sugar coated sugar was then diluted by a factor of 4 by adding Sugat® table sugar in a 3:1 ratio (Sugat®:coated sugar). This lowered the average concentration of pure silica with respect to the average concentration of sugar within the sugar formulation to about 0.17%.

Example 16

A concentrated sugar syrup was prepared at 60° C. according to Example 10. An additional quantity of the sugar was sieved to obtain the 500-600 μm fraction, the other fractions being discarded. 600 g of the sieved sugar (500-600 μm fraction) was added incrementally to the crystallizer over 1 minute, under constant mixing. Subsequently, 1.5 g of the silica (Flo-gard™ 233) was incrementally added over 30 seconds, again under constant mixing. This amount represents 0.13% by weight of pure silica with respect to the total amount of sugar in the process (i.e.,—in the syrup+sieved sugar).

Cooling crystallization was then effected according to the procedure delineated in Example 4. The initial temperature of the slurry was about 70° C. The crystallizer was cooled to about 30° C., by means of the heat transfer fluid disposed within the jacket of the crystallizer, to produce the coated sugar kernel particles. The solid/liquid separation was performed according to Example 7, with a centrifugation time of 40 seconds. Drying of the silica-and-sugar coated sugar was performed by means of a fluidized bed drier, according to the procedure provided in Example 9. The average concentration of pure silica with respect to the average concentration of sugar within the coated sugar particles was approximately 0.04%.

Example 17A

A concentrated sugar syrup was prepared at 60° C. according to Example 10. An additional quantity of the sugar was sieved to obtain the 500-600 μm fraction, the other fractions being discarded. 600 g of the sieved sugar (500-600 μm fraction) was added incrementally to the crystallizer over 1 minute, under constant mixing. Subsequently, 12 g of the silica (Flo-gard™ T-700) was incrementally added over 30 seconds, again under constant mixing. This amount represents 1% by weight of pure silica with respect to the total amount of sugar in the process (i.e.,—in the syrup+sieved sugar).

Evaporative cooling crystallization was then effected according to the procedure delineated in Example 5. The initial temperature of the slurry was about 70° C. The crystallizer was cooled to about 30° C., by means of vacuum, to produce the coated sugar kernel particles. The solid/liquid separation was performed according to Example 7, with a centrifugation time of 40 seconds. Drying of the silica-and-sugar coated sugar was performed by means of a fluidized bed drier, according to the procedure provided in Example 9. The weight of the coating was about 198 grams, or about 33% with respect to the original weight of the sugar kernel. The amount of pure silica within the coated layer was 3.99 grams, corresponding to an average concentration of about 2.0% of the coating. The concentration of pure silica with respect to the concentration of sugar within the coated sugar particles (i.e., average concentration on a silica to sugar basis) was 0.5%.

The silica-and-sugar coated sugar was then diluted by adding Sugat® table sugar in a 5.2:1 ratio (Sugat®:coated sugar). This lowered the average concentration of pure silica with respect to the average concentration of sugar within the sugar formulation to 0.08%.

Example 17B

A concentrated sugar syrup was prepared at 60° C. according to Example 10. An additional quantity of the sugar was sieved to obtain the 500-600 μm fraction, the other fractions being discarded. 600 g of the sieved sugar (500-600 μm fraction) was added incrementally to the crystallizer over 1 minute, under constant mixing. Subsequently, 60 g of the silica (Flo-gard™ T-700) was incrementally added over 30 seconds, again under constant mixing. This amount represents 5% by weight of pure silica with respect to the total amount of sugar in the process (i.e.,—in the syrup+sieved sugar).

Evaporative cooling crystallization was then effected according to the procedure delineated in Example 5. The initial temperature of the slurry was about 60° C. The crystallizer was cooled to about 30° C., by means of vacuum, to produce the coated sugar kernel particles. The solid/liquid separation was performed according to Example 7, with a centrifugation time of 40 seconds. Drying of the silica-and-sugar coated sugar was performed by means of a fluidized bed drier, according to the procedure provided in Example 9. The weight of the coating was about 108 grams, or about 18% with respect to the original weight of the sugar kernel. The amount of pure silica within the coated layer was approximately 11.9 grams, corresponding to about 11% of the coating, by average concentration. The average concentration of pure silica with respect to the average concentration of sugar within the coated sugar particles (i.e., average concentration on a silica to sugar basis) was approximately 1.71%, which corresponds to an average silica concentration of about 1.68% within the coated particles.

The silica-and-sugar coated sugar was then diluted by a factor of 8.5 by adding Sugat® table sugar in a 7.5:1 ratio (Sugat®:coated sugar). This lowered the average concentration of pure silica with respect to the average concentration of sugar within the sugar formulation to about 0.2%.

Example 18A

A concentrated sugar syrup was prepared at 60° C. according to Example 10. An additional quantity of the sugar was sieved to obtain the 500-600 μm fraction, the other fractions being discarded. 600 g of the sieved sugar (500-600 μm fraction) was added incrementally to the crystallizer over 1 minute, under constant mixing. Subsequently, 4 g of the silica (Flo-gard™ T-800) was incrementally added over 30 seconds, again under constant mixing. This amount represents about 0.33% by weight of pure silica with respect to the total amount of sugar in the process (i.e.,—in the syrup+sieved sugar).

The solid/liquid separation was performed according to Example 8, with a centrifugation time of 40 seconds. Drying of the silica-and-sugar coated sugar was performed by means of a fluidized bed drier, according to the procedure provided in Example 9. The average concentration of pure silica with respect to the average concentration of sugar within the coated sugar particles was approximately 0.08%.

Example 18B

A concentrated sugar syrup was prepared at 60° C. according to Example 10. An additional quantity of the sugar was sieved to obtain the 500-600 μm fraction, the other fractions being discarded. 600 g of the sieved sugar (500-600 μm fraction) was added incrementally to the crystallizer over 1 minute, under constant mixing. Subsequently, 4 g of the silica (Flo-gard™ T-800) was incrementally added over 30 seconds, again under constant mixing. This amount represents about 0.33% by weight of pure silica with respect to the total amount of sugar in the process (i.e.,—in the syrup+sieved sugar).

The solid/liquid separation was performed according to Example 8, with a centrifugation time of 25 seconds. Drying of the silica-and-sugar coated sugar was performed by means of a fluidized bed drier, according to the procedure provided in Example 9. The average concentration of pure silica with respect to the average concentration of sugar within the coated sugar particles was approximately 0.11%.

Example 19

Example 18A was repeated, using sorbitol instead of sugar. The average concentration of pure silica with respect to the average concentration of sugar within the coated sugar particles was approximately 0.10%.

Example 20

Example 14 was repeated, using sorbitol instead of sugar. The average concentration of pure silica with respect to the average concentration of sugar within the coated sugar particles was approximately 0.12%.

Example 21

Etching of the Silica-and-Sweetener Coated Sweetener Particles

In order to characterize the outer layer of the coated sweetener particles, an etching process was performed on the coated sweetener particles. It will be appreciated by those of skill in the art that the etching process may be designed to remove a portion of the coating without dissolving any (or very little) of the sweetener kernel. Alternatively, the etching process may be designed to remove substantially all of the coating, while dissolving only a portion or small portion of the sweetener kernel.

Each fraction from the etching process may be separately processed and analyzed to determine the respective concentration of silica.

In the case of sugar (typically sucrose), by way of example, an ethanol and water mixture (4:1 w:w) is used as the etching solvent. Typically, the sugar sample is sieved to provide a 500-595 μm fraction, using ASTM sieves Nos. 30, 35. 10 g of this fraction of the sugar is mixed with 50 ml of the EtOH:water mixture for 12 minutes at 400 rpm using an overhead stirrer. The resultant slurry is filtered, and the cake (containing the "etched" sugar particles) is oven-dried overnight at 65° C. An ash test is performed on the etched sugar in order to evaluate the silica concentration. This concentration may be compared to the silica concentration in the original sample of coated sugar (which may be quantified by the same ash test), and/or with the silica concentration in the dried filtrate (which may be quantified by the same ash test). The silica concentration in the dried filtrate represents the concentration of silica in the etched fraction.

It will be appreciated by those of skill in the art that various other analytical techniques may be used to characterize the outer layer or coating of the silica-and-sweetener coated sweetener particles, and to compare the characteristics with those of the material underlying the coating.

Figure 5:
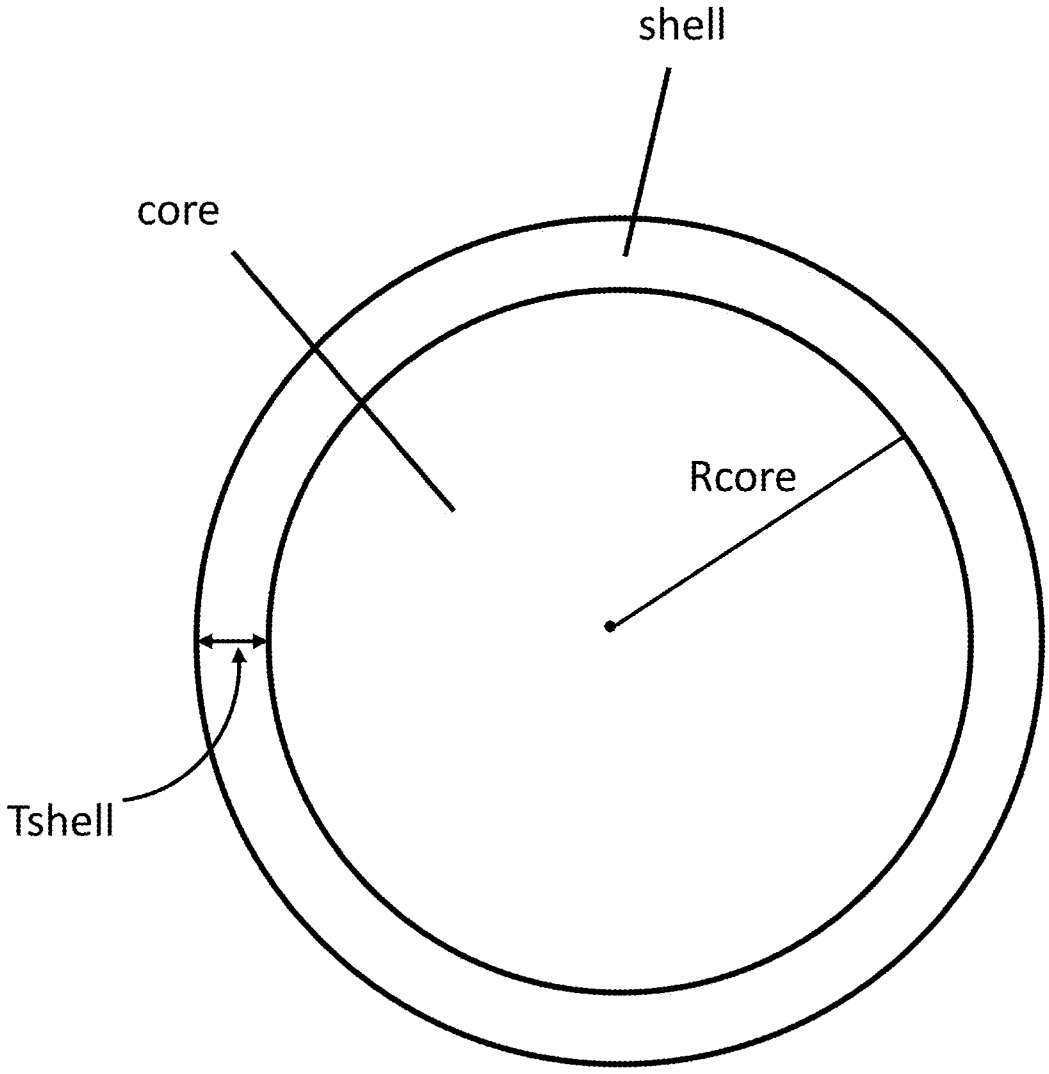
FIG. 5 is a schematic representation of a silica-and-sweetener coated sweetener particle consisting of a core having a radius or characteristic radius $R_{core}$, the core enveloped or at least partially enveloped by a shell.

With reference now to FIG. 5, FIG. 5 is a schematic representation of a spherical sweetener particle consisting of a core having a radius or characteristic radius $R_{core}$, the core enveloped or at least partially enveloped by a shell having a thickness $T_{shell}$. As described hereinabove, the etching process (such as that described in Example 21) may be performed so as to remove a portion of the shell without dissolving any (or very little) of the core. Alternatively, the etching process may be designed to remove substantially all of the shell, while dissolving only a portion or relatively small portion of the core.

As used herein in the Specification and claims, the term "standard etching process" refers to an etching process that removes, on average, 10 micrometers of the coated sweetener particles. The 10 micrometers is calculated based on a spherical model for the particles, as shown in FIG. 5. The model further assumes that the sweetener particles all have the size of $D_V50$, the particle volume averaged size of the population.

Since the kernel is typically a pure sugar or sweetener, the "core" may be (i.e., is typically) devoid or substantially devoid of silica. It is manifest that the average (weight) concentration of silica within the coating, $C_{SIL-shell}$, is greater than the average (weight) concentration of silica within the coating, $C_{SIL-core}$:

$$C_{SIL-shell}>C_{SIL-core}$$

The ratio $C_{SIL-shell}>C_{SIL-core}$ may be at most 0.2, and more typically, at most 0.1, at most 0.05, or at most 0.02. Most typically, $C_{SIL-shell}>C_{SIL-core}$ may be 0 or substantially 0. As above, these concentrations are calculated on a sweetener+silica basis.

It will be appreciated by those of skill in the art that various analytical techniques may be used to characterize the outer shell of the coated sweetener particles, and to compare the characteristics with those of the material in the core underlying the coating.

Example 22A

Fluorescent Labeling of Silica Particles 50 g of silica (Grace Syloid 9005) were mixed at 670 rpm with 20 g of Brilliant Blue FCF (E-133) in 500 ml of water at 65° C. for 5 hours. The mixture was transferred into centrifuge tubes and centrifugal action was applied at 6000 rpm for 20 minutes. The contents were filtered using filtration paper and the solids were washed with water. The silica was dried in an oven overnight, at 65° C., to yield fluorescent-labeled silica. The labeled silica was mixed with unlabeled silica (Grace Syloid 9005) in a ratio of 1:9 (w:w) labeled:unlabeled.

Example 22B

Fluorescent Labeling of Silica Particles

The diluted, fluorescent-labeled silica of Example 22A was utilized as described in Example 15 to yield silica-and-sugar coated sweetener particles.

Figure 6:
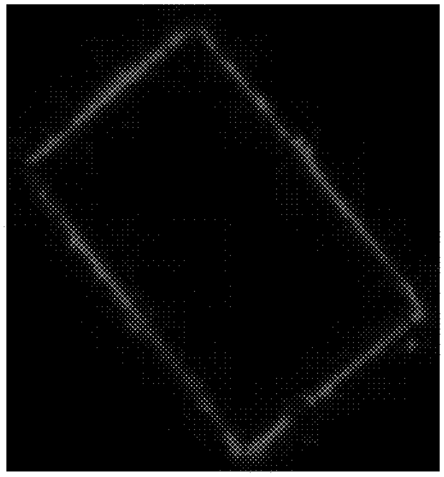
FIG. 6 is a magnified image of a silica-and-sugar coated sugar particle according to embodiments of the present invention, the particle containing fluorescent-labeled silica.

FIG. 6 is a magnified image obtained using a Leica TCS SP8 confocal microscope of a silica-and-sugar coated sugar particle according to embodiments of the present invention, the particle containing fluorescent-labeled silica, produced according to the methods of Example 22A and 22B. It is manifest that virtually all of the fluorescent-labeled silica is disposed on or near the surface of the crystalline sugar particle, in the coating or shell portion thereof.

Example 22C

Size Reduction of the Coated Sugar Formulations

The sweetener formulations may be milled in a mill such as an ultra-centrifugal mill (e.g., Retsch® ZM200) to obtain the desired PSD.

Figure 7:
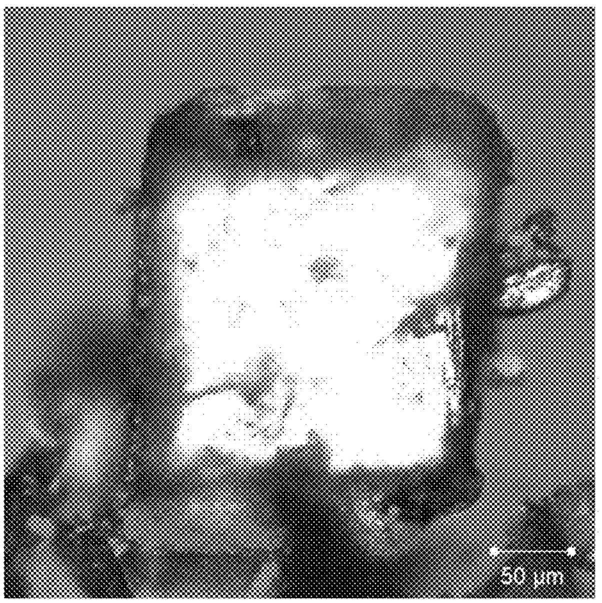
FIG. 7 is a magnified image of a ground silica-and-sugar sugar particle according to embodiments of the present invention, the ground particle containing fluorescent-labeled silica.

FIG. 7 is a magnified image of such a ground silica-and-sugar sugar particle according to embodiments of the present invention. The coated particle, which contained fluorescent-labeled silica, utilizing the method of Example 22B, was subsequently subjected to size reduction according to Example 22C. It is evident that virtually all of the fluorescent-labeled silica is disposed on or near the surface of the crystalline sugar particle, in the coating or shell portion thereof. Some of the faces of the sugar particle have little or no silica, perhaps indicating that these faces were created by the size reduction process.

Example 23

Preparation of Muffin Samples

Three types of muffin samples may be prepared. Type I is a "full sweetener (sugar)" control muffin, which may be similar in composition to typical, commercially available muffins. Type II is an inventive, reduced sweetener (sugar) muffin containing the inventive sweetener formulation, and typically, ordinary sugar or sweetener. Type III is a reduced sweetener (sugar) control muffin, having the identical composition as the Type II inventive, reduced sweetener (sugar) muffin, but being devoid of the silica in the sweetener particles.

The batter for each type of muffin contains sweetener (sugar), 14.2% sunflower oil, 21.8% wheat flour (containing approximately 40% starch), 24.5% eggs, baking powder (1.1%), flavors or flavorants (0.1%), salt (0.1%), and about 16.4% water. The batter of the Type I muffin contains 21.8 wt. % sweetener (sugar).

A fructooligosaccharide is used as a filler to make up for the reduced amount of sweetener (sugar) in the Type II and Type III samples. Typically, Gofos™ (containing ~2% sugar) is utilized.

The Type II muffin utilizes a sweetener formulation from various exemplary formulations (many of which are described or exemplified hereinabove). Aside from the formulative differences, the preparation and baking process is identical for the inventive muffin and the control muffins.

Example 23A

Typically, the Type II inventive, reduced-sweetener (sugar) muffin contains 39.1% less sweetener (sugar) with respect to the Type I "full sweetener" control muffin. For this exemplary case, the Type II and Type III muffins are formulated such that the batter contains about (100%−39.1%)·21.8%=13.3 wt. % sweetener (sugar), which contains (or more typically, a small portion of which contains) silica in the silica-and-sweetener coating. The fructooligosaccharide (Gofos™) content of the muffin batter is about 8.5 wt % (21.8%−13.38%).

Example 23B

In many cases, the Type II inventive, reduced-sweetener muffin may contain reduced sweetener (sugar) in an amount other than the typical reduction of 39.1%. By way of (non-exhaustive) example, the Type II muffin may contain 50% less sweetener (sugar), 35% less sweetener, 20% less sweetener, or 10% less sweetener. For an exemplary case of 20% less sweetener, the Type II muffin is formulated such that the batter contains about (100%−20%)·21.8%=17.44 wt. % sugar, and 4.36 wt. % Gofos™ (21.8%−17.44%). In any event, strictly for comparative purposes, the Type II muffin contains at least 10% less sweetener with respect to the Type I "full sweetener" control muffin.

Example 24

Preparation of Butter Cookie Samples

Three types of butter cookie samples may be prepared. Type I is a "full sweetener" or "full sugar" control butter cookie, which may be similar in composition to typical, commercially available butter cookies. Type II is an inventive, reduced-sugar butter cookie containing the inventive silica-and-sweetener coated sweetener particles. Typically, these silica-and-sweetener coated sweetener particles may be diluted with the regular sweetener (e.g., regular table sugar) to obtain the requisite amount of sweetener. Type III is a reduced sweetener (or reduced sugar) control butter cookie, having the identical composition as the Type II inventive, reduced sweetener butter cookie, but being devoid of the silica in the sweetener particles.

The batter for each type of butter cookie contains sweetener (sugar), 14.6% palm oil, 49.42% wheat flour (containing approximately 40% starch), corn starch (4.2%), water (5.7%), egg (3.6%), soy lecithin (0.19%), baking powder (0.3%), salt (0.2%), 1.2% invert sugar (containing 5% water), 1.5% heavy cream (containing 37% fat and 3.5% lactose), flavor or flavorants (0.1%). The sweetener (sugar) content of the Type I butter cookie batter is about 19.0%, and the sweetener (sugar) content of the Type I butter cookie is close to 19%.

Inulin is used as a filler to make up for the reduced amount of sweetener in the Type II and Type III samples. Typically, Orafti High Soluble Inulin (which contains 10% sugar) is utilized.

The Type II butter cookie utilizes a sweetener formulation from various exemplary formulations (many of which are described or exemplified hereinabove). Aside from the formulative differences, the preparation and baking process is identical for the inventive butter cookie and the control butter cookies.

Example 24A

Typically, the Type II inventive, reduced-sugar butter cookie contains about 40% less sweetener (sugar) with respect to the Type I "full sweetener" control butter cookie. For this exemplary case, the Type II and Type III butter cookies are formulated such that the batter contains about (100%−40.45%)·19.0%=11.3 wt. % sweetener (sugar), which contains (or more typically, a small portion of which contains) silica in the silica-and-sweetener coating. The inulin content of the batter is about 7.7 wt. % (19.0%−11.3%).

Example 24B

Substantially as in the case of the muffin samples provided hereinabove, in many cases, the Type II inventive, reduced sweetener butter cookie may contain reduced sweetener (sugar) in an amount other than the typical reduction of about 40%. By way of (non-exhaustive) example, the Type II butter cookie may contain 50% less sweetener, 40% less sweetener, 35% less sweetener, 20% less sweetener, or 10% less sweetener. Strictly for comparative purposes, the Type II butter cookie always contains at least 10% less sweetener with respect to the Type I "full sweetener" control butter cookie.

Example 25

Preparation of Hazelnut Spread Samples

Three types of hazelnut spread samples may be prepared. Type I is a "full sweetener" or "full sugar" control hazelnut spread, which may be similar in composition to typical, commercially available hazelnut spreads. Type II is an inventive, reduced-sugar hazelnut spread containing the inventive silica-and-sweetener coated sweetener particles. Typically, these silica-and-sweetener coated sweetener particles may be diluted with the regular sweetener (e.g., ordinary table sugar) to obtain the requisite amount of sweetener. Type III is a reduced sweetener (or reduced sugar) control hazelnut spread, having the identical composition as the Type II inventive, reduced sweetener hazelnut spread, but being devoid of the silica in the sweetener particles.

Each type of hazelnut spread contains sweetener (typically sugar), hazelnut paste (15%), palm oil (21.7%), cocoa powder (7.4%) having 12% fat, skim milk powder (6.6%), rapeseed lecithin (0.2%) and flavors or flavorants (0.1%). The sweetener (sugar) content of the Type I hazelnut spread is 49%.

A fructooligosaccharide is used as a filler to make up for the reduced amount of sweetener in the Type II and Type III samples. Typically, Gofos™ is utilized.

The Type II hazelnut spread utilizes a sweetener formulation from various exemplary formulations (many of which are described or exemplified hereinabove). Aside from the formulative differences, the preparation process is identical for the inventive hazelnut spread and the control hazelnut spreads.

Example 25A

Typically, the Type II inventive, reduced sweetener (sugar) hazelnut spread contains about 41% less sugar with respect to the Type I "full sweetener" control hazelnut spread. For this exemplary case, the Type II and Type III hazelnut spreads are formulated to contain about (100%–41.2%)·49%=28.8 wt. % sweetener (sugar), which contains (or more typically, a small portion of which contains) silica in the silica-and-sweetener coating. The inulin content of the hazelnut spread is about 20.2 wt. % (49%–29.4%).

Example 25B

Substantially as in the case of the hazelnut spread samples provided hereinabove, in many cases, the Type II inventive, reduced sweetener hazelnut spread may contain reduced sweetener (sugar) in an amount other than the typical reduction of about 40%. By way of (non-exhaustive) example, the Type II hazelnut spread may contain 50% less sweetener (sugar), 35% less sweetener, 20% less sweetener, or 10% less sweetener. Strictly for comparative purposes, the Type II hazelnut spread contains at least 10% less sweetener with respect to the Type I "full sweetener" control hazelnut spread.

Example 26

Sensory Evaluation

The exemplary sweetener or edible formulations (e.g., muffins, butter cookies and hazelnut spreads) may be evaluated by trained sensory panelists using a paired-comparison test. The paired-comparison test is a two-product blind test, and the panelists' task is to choose/indicate the sweeter one of the two products or samples (Sensory Evaluation Practices, 4th Ed., Stone, Bleibaum, Thomas, eds.). The results are analyzed using binomial distribution tables, which allows the sensory scientist to determine whether perceived differences between the samples are statistically significant.

A Comparative Sweetness Index may be calculated from the paired-comparison test results, compiled from all the panelists. For example, if, among 17 panelists, 10 chose the inventive product as being sweeter, while the other 7 panelists chose the comparative or control product, the Comparative Sweetness Index (CSI) would be calculated as:

$$CSI = (10/17)\cdot 100 = 58.8 = 59 \text{ (rounded)}$$

Broadly speaking, a CSI of 20-25 with respect to "identical" full sugar samples is considered to be a fair result; a CSI of 25-35 is considered to be a good result; a CSI of 35-45 is considered to be a very good result; and a CSI of 45 or more is considered to be an excellent result.

Example 27

Another sensory method used to evaluate samples is difference magnitude estimation (DME). Here, each panelist tastes the two samples, choose the sweetest, and also chooses the difference in sweetness, from the following list:

- ☐ No difference at all
- ☐ Extremely small difference
- ☐ Small difference
- ☐ Moderate difference
- ☐ Large difference
- ☐ Extremely large difference Each choice is given a numerical value of 0 to 5 (with "0" being "No difference at all"), and the average of the panel is calculated. When the inventive sample containing the silica-and-sweetener coated sweetener particles is indicated as being sweeter, the values are taken as positive, and vice versa). Generally, a difference of up to ±1.0 (i.e., within an absolute value of 1), and in some cases, up to ±0.8 or up to ±0.5, is considered to be insignificant (i.e., the sweetness of the samples is substantially the same). An insignificant difference is considered to be a good result for the inventive formulation vs. the control formulation.

Examples 28-31

The silica-and-sugar coated sugar produced in Examples 13, 15A, 17B and 17A were used to prepare butter cookies samples, according to Example 24.

Examples 32-35

Pair-comparison test results of the pair-comparison tests between Type I "full sugar" control butter cookie and the inventive Type II, reduced-sugar butter cookie (containing the inventive silica-and-sweetener coated sweetener particles coated sugars), performed and evaluated according to Example 26, are listed below in Table 1.

TABLE 1

| | % Silica in Butter Cookie | Silica Concentration in Coated Particles (average wt %) | Silica Concentration in coating, in % (silica: sugar) | Silica Concentration in kernel (%) | Comparative Sweetness Index (CSI) |
|---|---|---|---|---|---|
| EX 13 | 0.006 | 0.05 | 0.29 | 0 | 62 |
| EX 15A | 0.012 | 0.1 | 0.52 | 0 | 75 |
| EX 17B | 0.024 | 1.68 | 12.38 | 0 | 48 |
| EX 17A | 0.06 | 0.50 | 2.02 | 0 | 20 |

As used herein, the term "sweetener carbohydrate" refers to an edible sweetener having at least one carbohydrate moiety, which carbohydrate is processed within the human body to produce energy. This definition is meant to include sweetener carbohydrates having an energy value of at least 0.1 kcal/g, more typically, at least 0.2 kcal/g, more typically, at least 0.5 kcal/g, and yet more typically, at least 1.0 kcal/g. This definition is specifically meant to include allulose.

The term "sweetener carbohydrate" is specifically meant to exclude high-intensity sweeteners such as sucralose, aspartame, and acesulfame-K.

The term "sweetener", when used alone, is meant to include both sweetener carbohydrates and sweetener polyols.

A sweetener carbohydrate produces a sweet taste when consumed by the typical human consumer. If, on a normalized sweetness scale, on a weight basis, in which sucrose is taken as a standard of 1, maltose is about 0.31, and lactose is about 0.22, the term "sweetener carbohydrate" would apply to lactose, and to any sugar or other nutritive, carbohydrate-containing sweetener having a sweetness within the range of 0.15 to 2.5 on this normalized sweetness scale. Alternatively, it may be stated that the minimum sweetness for the sugar or other nutritive, carbohydrate-containing sweetener would be that of raffinose (which has a sweetness of 0.15 on the above-mentioned scale). More typically, such a sweetener carbohydrate has a sweetness within the range of 0.25 to 2.5, 0.35 to 2.5, 0.45 to 2.5, 0.25 to 1.8, 0.45 to 1.7, 0.15 to 1.7, or 0.35 to 1.5 on this normalized sweetness scale.

It is noted that the relative sweetness of fructose reported in the literature has been reported to be as little as 0.91, and as much as about 1.7. For the avoidance of doubt, the term "sweetener carbohydrate" is meant to include fructose, irrespective of any of its reported relative sweetness values.

As used herein, the term "normalized sweetness scale", refers to a relative sweetness scale, on a weight basis, in which sucrose is assigned a value of 1.00. More specifically, the normalized sweetness scale is determined according to the methods disclosed in Moscowitz, H. "Ratio Scales of Sugar Sweetness"; Perception & Psychophysics, 1970, Vol. 7 (5), in which the power function for the sugars and polyols/sugar alcohols has an exponent of 1.3 (n=1.3), as disclosed therein in Table 3, and as provided hereinbelow.

From "Ratio Scales of Sugar Sweetness"

| | Percent by Weight Basis | |
|---|---|---|
| | Rank | Relative Sweetness |
| Sucrose | 1 | 1.00 |
| Fructose | 2 | 0.91 |
| Raftinose | 15 | 0.15 |
| Maltose | 12 | 0.31 |
| Lactose | 14 | 0.22 |
| Dulcitol | 5 | 0.46 |
| Glucose | 4 | 0.45 |
| Galactose | 6 | 0.42 |
| Sorbose | 7 | 0.41 |
| Sorbitol | 9 | 0.37 |
| Mannitol | 11 | 0.33 |
| Arabinose | 8 | 0.39 |
| Rhamnose | 10 | 0.35 |
| Glycerol | 3 | 0.50 |
| Xylose | 13 | 0.26 |

A sweetener carbohydrate may be a monosaccharide or a disaccharide. Examples of sweetener carbohydrates include, but are not limited to, sucrose, glucose, maltose, fructose, lactose, or any combination of sweetener carbohydrates. One or more sweetener carbohydrate may be combined with one or more sweetener polyols. A sweetener carbohydrate may be naturally occurring or synthetically produced.

As used herein, the term "sweetener polyol" refers to a consumable polyol that produces a sweet taste when consumed by the typical human consumer. Non-limiting examples of sweetener polyols include xylitol, maltitol, erythritol, sorbitol, threitol, arabitol, hydrogenated starch hydrolysates (HSH), isomalt, lactitol, mannitol, or galactitol (dulcitol). In many instances, the polyol is a sugar alcohol. A sugar alcohol can be produced from a carbohydrate by any known method of reduction (via a chemical or biological transformation) of an acid or aldehyde to an alcohol. In other cases, a sweetener polyol can be synthesized from a parent carbohydrate. Alternatively, a sweetener polyol may be obtained from a biological source.

For the avoidance of doubt, the term "sweetener polyol" is meant to include any polyol/sugar alcohol having a sweetness within the range of 0.15 to 2.5 on the above-described normalized sweetness scale. More typically, such a sweetener polyol has a sweetness within the range of 0.15 to 1.5, 0.15 to 1.0, 0.15 to 0.8, 0.15 to 0.7, 0.20 to 0.7, 0.15 to 0.6, or 0.25 to 0.6, on this normalized sweetness scale.

Additional Embodiments

Additional Embodiments 1 to 181 are provided hereinbelow.

Embodiment 1. A method including: (a) providing a slurry containing solids disposed in an aqueous medium containing dissolved sweetener, the solids including silica particles and sweetener kernel particles; and (b) drying at least a portion of the solids to produce a dried sweetener product containing coated sweetener particles having a silica-and-sweetener coating enveloping the sweetener kernel particles.

Embodiment 2. The method of Embodiment 1, further including, prior to the drying: separating off a first portion of the aqueous medium and a first portion of the silica particles from the sweetener kernel particles.

Embodiment 3. The method of Embodiment 1, further including, prior to the drying: depositing at least a portion of the dissolved sweetener in the aqueous medium onto the sweetener kernel particles to produce a sweetener coating enveloping the sweetener kernel particles, the sweetener coating including at least a portion of the silica particles.

Embodiment 4. The method of Embodiment 3, further including, following the depositing: separating off a first portion of the aqueous medium and a first portion of the silica particles from the sweetener kernel particles, thereby leaving the at least a portion of the solids as a wet cake in which a second portion of the aqueous medium and a second portion of the silica particles are disposed around the sweetener kernel particles.

Embodiment 5. The method of Embodiment 3 or Embodiment 4, wherein the depositing includes crystallizing.

Embodiment 6. The method of Embodiment 5, wherein at least a portion of the crystallizing is performed by cooling crystallization.

Embodiment 7. The method of Embodiment 5 or Embodiment 6, wherein at least a portion of the crystallizing is performed by evaporative crystallization.

Embodiment 8. The method of any one of the preceding Embodiments, further including performing a size-reduction operation on the dried sweetener product.

Embodiment 9. The method of any one of the preceding Embodiments, further including performing a size-reduction operation on the solids.

Embodiment 10. The method of any one of the preceding Embodiments, further including diluting the silica concentration of the dried sweetener product with a solid sweetener containing a lower concentration of silica with respect to the dried sweetener product, to produce a diluted silica-containing sweetener product.

Embodiment 10A. The method of Embodiment 10, wherein said diluting with said solid sweetener is performed whereby a concentration ratio of the concentration of silica within the diluted silica-containing sweetener product to the concentration of silica within the dried sweetener product is at most 0.8.

Embodiment 10B. The method of Embodiment 10A, wherein said concentration ratio is at most 0.5.

Embodiment 10C. The method of Embodiment 10A, wherein said concentration ratio is at most 0.2.

Embodiment 10D. The method of Embodiment 10A, wherein said concentration ratio is at most 0.1.

Embodiment 10E. The method of Embodiment 10A, wherein said concentration ratio is at most 0.03.

Embodiment 10F. The method of Embodiment 10A, wherein said concentration ratio is at most 0.01.

Embodiment 10G. The method of Embodiment 10A, wherein said concentration ratio is within a range of 0.001 to 0.8.

Embodiment 10H. The method of Embodiment 10A, wherein said concentration ratio is within a range of 0.005 to 0.8.

Embodiment 10I. The method of Embodiment 10A, wherein said concentration ratio is within a range of 0.02 to 0.8.

Embodiment 10J. The method of Embodiment 10A, wherein said concentration ratio is within a range of 0.01 to 0.8.

Embodiment 10K. The method of Embodiment 10A, wherein said concentration ratio is within a range of 0.005 to 0.2.

Embodiment 10L. The method of Embodiment 10A, wherein said concentration ratio is within a range of 0.02 to 0.2.

Embodiment 11. The method of any one of Embodiments 10 to 10L, wherein the solid sweetener contains at most 0.03% silica.

Embodiment 11A. The method of any one of Embodiments 10 to 10L, wherein the solid sweetener contains at most 0.01% silica.

Embodiment 11B. The method of any one of Embodiments 10 to 10L, wherein the solid sweetener is devoid or substantially devoid of silica.

Embodiment 12. The method of any one of Embodiments 10 to 11B, wherein the solid sweetener has the same chemical identity as the sweetener kernel particles.

Embodiment 13. The method of any one of Embodiments 10 to 12, wherein the solid sweetener is a sugar.

Embodiment 14. The method of Embodiment 13, wherein the sugar includes sucrose.

Embodiment 15. The method of Embodiment 13, wherein the sugar predominantly includes sucrose.

Embodiment 16. The method of Embodiment 13, wherein the sugar is sucrose.

Embodiment 17. The method of any one of the preceding Embodiments, further including contacting a plurality of sweetener particles with an aqueous medium containing the dissolved sweetener and the silica particles, to produce the slurry.

Embodiment 18. The method of any one of the preceding Embodiments, wherein the weight ratio of the sweetener kernel particles to the dried sweetener product is within the range of 55% to 98%.

Embodiment 19. The method of any one of the preceding Embodiments, wherein the weight ratio of the sweetener kernel particles to the dried sweetener product is within the range of 55% to 95%.

Embodiment 20. The method of any one of the preceding Embodiments, wherein the weight ratio of the sweetener kernel particles to the dried sweetener product is within the range of 60% to 95%.

Embodiment 21. The method of any one of the preceding Embodiments, wherein the weight ratio of the sweetener kernel particles to the dried sweetener product is within the range of 65% to 95%.

Embodiment 22. The method of any one of the preceding Embodiments, wherein the weight ratio of the sweetener kernel particles to the dried sweetener product is within the range of 70% to 95%.

Embodiment 23. The method of any one of the preceding Embodiments, wherein the weight ratio of the sweetener kernel particles to the dried sweetener product is within the range of 75% to 95%.

Embodiment 24. The method of any one of the preceding Embodiments, wherein the weight ratio of the sweetener kernel particles to the dried sweetener product is within the range of 60% to 90%.

Embodiment 25. The method of any one of the preceding Embodiments, wherein the weight ratio of the sweetener kernel particles to the sweetener product is at most 90%.

Embodiment 26. The method of any one of the preceding Embodiments, wherein the weight ratio of the sweetener kernel particles to the sweetener product is at most 85%.

Embodiment 27. The method of any one of the preceding Embodiments, wherein the weight ratio of the silica particles to the dried sweetener product is within the range of 0.02% to 5%.

Embodiment 28. The method of any one of the preceding Embodiments, wherein the weight ratio of the silica particles to the dried sweetener product is within the range of 0.1% to 5%.

Embodiment 29. The method of any one of the preceding Embodiments, wherein the weight ratio of the silica particles to the dried sweetener product is within the range of 0.2% to 5%.

Embodiment 30. The method of any one of the preceding Embodiments, wherein the weight ratio of the silica particles to the dried sweetener product is within the range of 0.35% to 5%.

Embodiment 31. The method of any one of the preceding Embodiments, wherein the weight ratio of the silica particles to the dried sweetener product is within the range of 0.5% to 5%.

Embodiment 32. The method of any one of the preceding Embodiments, wherein the silica particles have an average particle size (D50) within the range of 0.5 to 20 micrometers.

Embodiment 33. The method of any one of the preceding Embodiments, wherein the silica particles have an average particle size (D50) within the range of 1 to 20 micrometers.

Embodiment 34. The method of any one of the preceding Embodiments, wherein $C_{SIL\text{-}coating}$ is a first average concentration of the silica particles disposed in an outermost layer of the coated sweetener particles; wherein $C_{SIL\text{-}kernel}$ is a second average concentration of the silica particles disposed in the coated sweetener particles, radially inward with respect to the outermost layer; and wherein the ratio of $C_{SIL\text{-}kernel}$ to $C_{SIL\text{-}coating}$ is less than 1.

Embodiment 35. The method of Embodiment 32, wherein the ratio of $C_{SIL\text{-}kernel}$ to $C_{SIL\text{-}coating}$ is at most 0.2.

Embodiment 36. The method of Embodiment 32, wherein the ratio of $C_{SIL\text{-}kernel}$ to $C_{SIL\text{-}coating}$ is at most 0.1.

Embodiment 37. The method of Embodiment 32, wherein the ratio of $C_{SIL\text{-}kernel}$ to $C_{SIL\text{-}coating}$ is at most 0.05.

Embodiment 38. The method of Embodiment 32, wherein the ratio of $C_{SIL\text{-}kernel}$ to $C_{SIL\text{-}coating}$ is at most 0.02.

Embodiment 39. The method of Embodiment 32, wherein the ratio of $C_{SIL\text{-}kernel}$ to $C_{SIL\text{-}coating}$ is zero.

Embodiment 40. The method of any one of the preceding Embodiments, including or further including, performing a solid/liquid separation to effect separation of a or the first portion of the aqueous medium and a or the first portion of the silica particles from the sweetener kernel particles.

Embodiment 41. The method of Embodiment 40, wherein the solid/liquid separation includes filtration.

Embodiment 42. The method of Embodiment 40 or Embodiment 41, wherein the solid/liquid separation includes centrifugation.

Embodiment 43. The method of any one of the preceding Embodiments, the sweetener solids having an average particle size (D50) of at least 150 micrometers.

Embodiment 44. The method of any one of the preceding Embodiments, wherein the sweetener kernel particles have an average particle size (D50) of at least 50 micrometers (μ).

Embodiment 45. The method of Embodiment 44, wherein the D50 of the sweetener kernel particles is at least 75μ.

Embodiment 46. The method of Embodiment 44, wherein the D50 of the sweetener kernel particles is at least 100μ.

Embodiment 47. The method of Embodiment 44, wherein the D50 of the sweetener kernel particles is at least 125μ.

Embodiment 48. The method of Embodiment 44, wherein the D50 of the sweetener kernel particles is at least 150μ, at least 175μ, or at least 200μ.

Embodiment 49. The method of Embodiment 44, wherein the D50 of the sweetener kernel particles is at least 250μ.

Embodiment 50. The method of Embodiment 44, wherein the D50 of the sweetener kernel particles is at least 300μ, at least 350μ, at least 400μ, or at least 450μ.

Embodiment 51. The method of any one of the preceding Embodiments, wherein the sweetener kernel particles have an average particle size (D50) within the range of 50 to 1500μ.

Embodiment 52. The method of Embodiment 44, wherein the D50 of the sweetener kernel particles is within the range of 75 to 1500μ or 125 to 1500μ.

Embodiment 53. The method of Embodiment 44, wherein the D50 of the sweetener kernel particles is within the range of 150 to 1500μ.

Embodiment 54. The method of Embodiment 44, wherein the D50 of the sweetener kernel particles is within the range of 250 to 1500μ, 350 to 1500μ, 50 to 1200μ, 50 to 1000μ, 50 to 800μ, or 175 to 1200μ.

Embodiment 55. The method of Embodiment 44, wherein the D50 of the sweetener kernel particles is within the range of 175 to 800μ.

Embodiment 56. The method of Embodiment 44, wherein the D50 of the sweetener kernel particles is within the range of 200 to 1000μ, 250 to 1200μ, 250 to 1000μ, 250 to 800μ, 350 to 1500μ, 350 to 1200μ, 350 to 1000μ, 350 to 800μ, 350 to 700μ, 400 to 800μ, or 400 to 700μ.

Embodiment 57. A method including: (a) contacting sweetener particles with an aqueous medium containing dissolved sweetener and silica particles, to produce a slurry containing sweetener kernel particles and the silica particles in a sweetener solution; (b) separating off a first portion of the aqueous medium and a first portion of the silica particles from the sweetener kernel particles, and leaving a wet cake in which a second portion of the aqueous medium and a second portion of the silica particles are disposed around the sweetener kernel particles; and (c) drying the wet cake to produce a dried sweetener product containing coated particles having a silica-and-sweetener coating enveloping the sweetener kernel particles, the silica-and-sweetener coating including silica particles from the second portion of the silica particles; wherein the sweetener kernel particles optionally have an average particle size ($D_{50}$) of at least 100 micrometers; and wherein a concentration of the silica particles within the dried sweetener product, by weight, is optionally within the range of 0.02% to 5%.

Embodiment 58. A method including: (a) contacting sweetener particles with an aqueous medium containing dissolved sweetener and silica particles, to produce a slurry containing sweetener kernel particles and the silica particles in a sweetener solution; (b) separating off a first portion of the aqueous medium and a first portion of the silica particles from the sweetener kernel particles, and leaving a wet cake in which a second portion of the aqueous medium and a second portion of the silica particles are disposed around the sweetener kernel particles; and (c) drying the wet cake to produce a dried sweetener product containing coated particles having a silica-and-sweetener coating enveloping the sweetener kernel particles, the silica-and-sweetener coating including silica particles from the second portion of the silica particles; wherein the sweetener kernel particles have an average particle size ($D_{50}$) of at least 100 micrometers; and wherein a concentration of the silica particles within the dried sweetener product, by weight, is within the range of 0.02% to 5%.

Embodiment 59. A method including: (a) providing a slurry containing silica particles and sweetener kernel particles in an aqueous medium containing dissolved sweetener; and (b) crystallizing at least a portion of the dissolved sweetener in the aqueous medium onto the sweetener kernel particles to produce a sweetener product in a mother liquor, the sweetener product containing coated sweetener particles having a sweetener coating enveloping the sweetener kernel particles, the sweetener coating including at least a portion of the silica particles.

Embodiment 60. A method including: (a) providing a slurry containing silica particles and sweetener kernel particles in an aqueous medium containing dissolved sweetener; the silica particles optionally having an average particle size (D50) within the range of 1 to 20 micrometers; and (b) depositing at least a portion of the dissolved sweetener in the aqueous medium onto the sweetener kernel particles to produce a sweetener product, the sweetener product containing coated sweetener particles having a sweetener-coating enveloping the sweetener kernel particles, the sweetener coating including at least a portion of the silica particles; wherein a weight ratio of the sweetener kernel particles to the sweetener product is within the range of 55% to 95%; and wherein a weight ratio of the silica particles to the sweetener product is within the range of 0.02% to 5%.

Embodiment 61. The method of Embodiment 57 or Embodiment 58, further including, prior to the separating off, depositing at least a portion of sweetener from the sweetener solution, along with a portion of the silica particles disposed in the aqueous medium onto the sweetener kernel particles.

Embodiment 62. The method of any one of the preceding Embodiments, wherein an average particle size (D50) of silica particles within the dried sweetener product is within the range of 1 to 20 micrometers.

Embodiment 63. The method of any one of the preceding Embodiments, wherein a weight ratio of the sweetener kernel particles to the dried sweetener product is within the range of 55% to 95%.

Embodiment 64. The method of any one of the preceding Embodiments, wherein a weight ratio of the silica-and-sweetener coating to the sweetener product is within the range of 5% to 45%.

Embodiment 65. The method of any one of the preceding Embodiments, wherein $C_{SIL\text{-}coating}$ is a first average concentration of the silica particles disposed in an outermost layer of the silica-and-sweetener coating/the dried sweetener product; wherein $C_{SIL\text{-}kernel}$ is a second average concentration of the silica particles disposed in the coated sweetener particles, radially inward with respect to the outermost layer; and wherein $C_{SIL\text{-}coating} > C_{SIL\text{-}kernel}$.

Embodiment 66. The method of any one of the preceding Embodiments, wherein a weight ratio of the silica particles to the sweetener product is within the range of 0.02% to 5%.

Embodiment 67. The method of any one of the preceding Embodiments, wherein a weight ratio of the sweetener coating to the sweetener product is within the range of 5% to 45%.

Embodiment 68. The method of any one of the preceding Embodiments, wherein a or the weight ratio of the sweetener kernel particles to the sweetener product is at least 60%.

Embodiment 69. The method of any one of the preceding Embodiments, wherein a or the weight ratio of the sweetener kernel particles to the sweetener product is at least 65%.

Embodiment 70. The method of any one of the preceding Embodiments, wherein a or the weight ratio of the sweetener kernel particles to the sweetener product is at least 70%.

Embodiment 71. The method of any one of the preceding Embodiments, wherein a or the weight ratio of the sweetener kernel particles to the sweetener product is at least 75%.

Embodiment 72. The method of any one of the preceding Embodiments, wherein a or the weight ratio of the sweetener kernel particles to the sweetener product is at most 95%.

Embodiment 73. The method of any one of the preceding Embodiments, wherein a or the weight ratio of the sweetener kernel particles to the sweetener product is at most 90%.

Embodiment 74. The method of any one of the preceding Embodiments, wherein a or the weight ratio of the sweetener kernel particles to the sweetener product is at most 85%.

Embodiment 75. The method of any one of the preceding Embodiments, further including, subsequent to the crystallizing, performing a solid/liquid separation to remove at least a portion of the mother liquor from the sweetener product.

Embodiment 76. The method of Embodiment 75, wherein the solid/liquid separation includes filtration.

Embodiment 77. The method of Embodiment 75 or Embodiment 76, wherein the solid/liquid separation includes centrifugation.

Embodiment 78. The method of any one of the preceding Embodiments, the method further including evaporating at least a portion of water in the mother liquor.

Embodiment 79. The method of any one of the preceding Embodiments, the sweetener solids having an average particle size (D50) of at least 150 micrometers.

Embodiment 80. The method of any one of the preceding Embodiments, wherein $C_{SIL\text{-}kernel}/C_{SIL\text{-}coating}$ is at most 0.4, at most 0.2, or at most 0.1.

Embodiment 81. The method of any one of the preceding Embodiments, wherein $C_{SIL\text{-}kernel}/C_{SIL\text{-}coating}$ is at most 0.05, or at most 0.02.

Embodiment 82. The method of any one of the preceding Embodiments, wherein the sweetener kernel particles have an average particle size (D50) of at least 50 micrometers (μ), at least 75μ, at least 100μ, at least 125μ, or at least 150μ.

Embodiment 83. The method of any one of the preceding Embodiments, wherein the sweetener kernel particles have an average particle size (D50) of at least 175μ, at least 200μ, at least 250μ, at least 300μ, at least 350μ, at least 400μ, or at least 450μ.

Embodiment 84. The method of any one of the preceding Embodiments, wherein the sweetener kernel particles having an average particle size (D50) within the range of 50 to 1500μ, 75 to 1500μ, 150 to 1500μ, 250 to 1500μ, 350 to 1500μ, 50 to 1200μ, 50 to 1000μ, 50 to 800μ, 175 to 1200μ, 175 to 800μ, 200 to 1000μ, 250 to 1200μ, 250 to 1000μ, 250 to 800μ, 350 to 1500μ, 350 to 1200μ, 350 to 1000μ, 350 to 800μ, 350 to 700μ, 400 to 800μ, or 400 to 700μ.

Embodiment 85. The method of any one of the preceding Embodiments, wherein the sweetener kernel particles have an average particle size (D50) within the range of 100 to 1500μ.

Embodiment 86. The method of any one of the preceding Embodiments, wherein the sweetener kernel particles have an average particle size (D50) within the range of 175 to 1000μ.

Embodiment 87. A sweetener formulation including: coated sweetener particles, each sweetener particle of at least a portion of the sweetener particles having: (a) a sweetener core; (b) a sweetener shell at least partially enveloping the sweetener core; and (c) silica particles disposed at least within the sweetener shell; wherein the first concentration or average concentration of the silica particles within the sweetener shell is $C_{SIL\text{-}shell}$; wherein the second concentration or average concentration of the silica particles within the sweetener core is $C_{SIL\text{-}core}$; and wherein $C_{SIL\text{-}shell} > C_{SIL\text{-}core}$.

Embodiment 88. The formulation of Embodiment 87, wherein $C_{SIL\text{-}core}/C_{SIL\text{-}shell}$ is at most 0.4.

Embodiment 89. The formulation of Embodiment 87, wherein $C_{SIL\text{-}core}/C_{SIL\text{-}shell}$ is at most 0.2.

Embodiment 90. The formulation of Embodiment 87, wherein $C_{SIL\text{-}core}/C_{SIL\text{-}shell}$ is at most 0.1.

Embodiment 91. The formulation of Embodiment 87, wherein $C_{SIL\text{-}core}/C_{SIL\text{-}shell}$ is at most 0.05.

Embodiment 92. The formulation of Embodiment 87, wherein $C_{SIL\text{-}core}/C_{SIL\text{-}shell}$ is at most 0.02.

Embodiment 93. A sweetener formulation including: coated sweetener particles, each sweetener particle of at least a portion of the sweetener particles having: (a) a sweetener core; (b) a sweetener coating at least partially enveloping the sweetener core; and (c) silica particles disposed at least within the sweetener coating; wherein $C_{SIL\text{-}shell}$ is a first average concentration of the silica particles disposed in an outermost layer of the sweetener coating; wherein $C_{SIL\text{-}core}$ is a second average concentration of the silica particles disposed in the coated sweetener particles, radially inward with respect to the outermost layer; and wherein $C_{SIL\text{-}shell} > C_{SIL\text{-}core}$.

Embodiment 94. The formulation of Embodiment 93, wherein $C_{SIL\text{-}core}/C_{SIL\text{-}shell}$ is at most 0.4.

Embodiment 95. The formulation of Embodiment 93, wherein $C_{SIL\text{-}core}/C_{SIL\text{-}shell}$ is at most 0.2.

Embodiment 96. The formulation of Embodiment 93, wherein $C_{SIL\text{-}core}/C_{SIL\text{-}shell}$ is at most 0.1.

Embodiment 97. The formulation of Embodiment 93, wherein $C_{SIL\text{-}core}/C_{SIL\text{-}shell}$ is at most 0.05.

Embodiment 98. The formulation of Embodiment 93, wherein $C_{SIL\text{-}core}/C_{SIL\text{-}shell}$ is at most 0.02.

Embodiment 99. The formulation of any one of Embodiments 87 to 98, wherein $C_{SIL\text{-}core}$ and $C_{SIL\text{-}shell}$ are determined using a standard etching process.

Embodiment 100. The formulation of any one of Embodiments 87 to 99, wherein the formulation is in the form of a particulate solid such as a free-flowing powder.

Embodiment 101. The formulation of Embodiment 100, wherein the particulate solid is a powder.

Embodiment 102. An edible formulation including: (a) a sweetener including the coated sweetener particles of any one of Embodiments 87 to 101; (b) at least one fat; and (c) optionally, at least one starch.

Embodiment 103. The edible formulation of Embodiment 102, wherein the weight content of the sweetener or the coated sweetener particles is at least 5%.

Embodiment 104. The edible formulation of Embodiment 103, wherein the weight content of the sweetener within the edible formulation is at least 8%.

Embodiment 105. The edible formulation of Embodiment 103, wherein the weight content of the sweetener within the edible formulation is at least 10%.

Embodiment 106. The edible formulation of Embodiment 103, wherein the weight content of the sweetener within the edible formulation is at least 15%.

Embodiment 107. The edible formulation of Embodiment 103, wherein the weight content of the sweetener within the edible formulation is at least 20%.

Embodiment 108. The edible formulation of Embodiment 103, wherein the weight content of the sweetener within the edible formulation is at least 25%.

Embodiment 109. The edible formulation of Embodiment 103, wherein the weight content of the sweetener within the edible formulation is at least 30%.

Embodiment 110. The edible formulation of Embodiment 103, wherein the weight content of the sweetener within the edible formulation is at least 40%.

Embodiment 111. The edible formulation of Embodiment 103, wherein the weight content of the sweetener within the edible formulation is at least 50%.

Embodiment 112. The edible formulation of Embodiment 103, wherein the weight content of the sweetener within the edible formulation is at least 65%.

Embodiment 113. The edible formulation of Embodiment 103, wherein the weight content of the sweetener within the edible formulation is at least 75%.

Embodiment 114. The edible formulation of Embodiment 103, wherein the weight content of the sweetener within the edible formulation is at least 85%.

Embodiment 115. The edible formulation of Embodiment 103, wherein the weight content of the sweetener within the edible formulation is at least 90%.

Embodiment 116. The edible formulation of Embodiment 103, wherein the weight content of the sweetener within the edible formulation is at least 95%.

Embodiment 117. The edible formulation of any one of Embodiments 102 to 116, wherein the weight content of the sweetener or the coated sweetener particles is within the range of 8% to 80%.

Embodiment 118. The edible formulation of Embodiment 117, wherein the weight content is within the range of 10% to 70%.

Embodiment 119. The edible formulation of Embodiment 117, wherein the weight content is within the range of 15% to 70%.

Embodiment 120. An edible formulation including: (a) a sweetener including the coated sweetener particles of any one of Embodiments 87 to 119; (b) at least one fat; (c) optionally, at least one starch; and (d) optionally, at least one edible filler; wherein a weight-to-weight ratio of the silica to the sweetener within the sweetener particles is optionally within the range of 0.02% to 1.5%; and wherein a total concentration of the sweetener, the at least fat, and the at least one starch, within the edible formulation, is at least 30%, on a weight basis.

Embodiment 121. The edible formulation of Embodiments 87 to 120, the edible formulation further including an or the edible filler.

Embodiment 122. The edible formulation of Embodiment 121, wherein the concentration of the edible filler is at least 3%.

Embodiment 123. The edible formulation of Embodiment 122, wherein the concentration of the edible filler is at least 5%.

Embodiment 124. The edible formulation of Embodiment 122, wherein the concentration of the edible filler is at least 7%.

Embodiment 125. The edible formulation of Embodiment 122, wherein the concentration of the edible filler is at least 10%.

Embodiment 126. The edible formulation of Embodiment 122, wherein the concentration of the edible filler is at least 12%.

Embodiment 127. The edible formulation of Embodiment 122, wherein the concentration of the edible filler is at least 15%.

Embodiment 128. The edible formulation of Embodiment 122, wherein the concentration of the edible filler is within the range of 3% to 35%.

Embodiment 129. The edible formulation of Embodiment 122, wherein the concentration of the edible filler is within the range of 3% to 30%.

Embodiment 130. The edible formulation of Embodiment 122, wherein the concentration of the edible filler is within the range of 5% to 30%.

Embodiment 131. The edible formulation of Embodiment 122, wherein said concentration of said edible filler is within the range of 7% to 25%.

Embodiment 132. The edible formulation of Embodiment 122, wherein said concentration of said edible filler is within the range of 10% to 35%.

Embodiment 133. The edible formulation of Embodiment 122, wherein said concentration of said edible filler is within the range of 10% to 25%.

Embodiment 134. The edible formulation of Embodiment 122, wherein said concentration of said edible filler is within the range of 12% to 25%.

Embodiment 135. The edible formulation of Embodiment 122, wherein said concentration of said edible filler is within the range of 15% to 25%.

Embodiment 136. The edible formulation of any one of Embodiments 121 to 135, wherein the edible filler is or includes a soluble fiber.

Embodiment 137. The edible formulation of Embodiment 136, wherein the edible filler is or includes a dietary fiber.

Embodiment 138. The edible formulation of Embodiment 137, wherein the dietary fiber is a soluble dietary fiber.

Embodiment 139. The edible formulation of any one of Embodiments 122 to 138, wherein the edible filler is, or includes, a polysaccharide filler.

Embodiment 140. The edible formulation of Embodiment 139, wherein the polysaccharide filler is, or includes, a fructan.

Embodiment 141. The edible formulation of Embodiment 140, wherein the fructan is inulin.

Embodiment 142. The edible formulation of Embodiment 140, wherein the fructan includes inulin.

Embodiment 143. The edible formulation of any one of Embodiments 121 to 142, wherein the edible filler is, or includes, an oligosaccharide.

Embodiment 144. The edible formulation of Embodiment 143, wherein the oligosaccharide is, or includes, a fructooligosaccharide.

Embodiment 145. The edible formulation of Embodiment 136 or Embodiment 138, wherein the soluble fiber is, or includes, a resistant maltodextrin.

Embodiment 146. The edible formulation of Embodiment 136 or Embodiment 138, wherein the soluble fiber is, or includes, soluble corn fiber.

Embodiment 147. The edible formulation of Embodiment 136 or Embodiment 138, wherein the soluble fiber is, or includes, polydextrose.

Embodiment 148. The edible formulation of any one of Embodiments 87 to 147, wherein the total concentration of the sweetener and the at least one fat is at least 10%, on a weight basis.

Embodiment 149. The edible formulation of Embodiment 148, wherein the total concentration of the sweetener and the at least one fat is at least 15%.

Embodiment 150. The edible formulation of Embodiment 148, wherein the total concentration of the sweetener and the at least one fat is at least 20%.

Embodiment 151. The edible formulation of Embodiment 148, wherein the total concentration of the sweetener and the at least one fat is at least 25%.

Embodiment 152. The edible formulation of Embodiment 148, wherein the total concentration of the sweetener and the at least one fat is at least 30%, or a least 40%.

Embodiment 153. The edible formulation of any one of Embodiments 87 to 152, wherein the total concentration of the sweetener, the at least one fat, and the at least one starch within the edible formulation is at least 32%, on a weight basis.

Embodiment 154. The edible formulation of Embodiment 153, wherein the total concentration of the sweetener, the at least one fat, and the at least one starch within the edible formulation is at least 35%.

Embodiment 155. The edible formulation of Embodiment 153, wherein the total concentration of the sweetener, the at least one fat, and the at least one starch within the edible formulation is at least 40%.

Embodiment 156. The edible formulation of Embodiment 153, wherein the total concentration of the sweetener, the at least one fat, and the at least one starch within the edible formulation is at least 45%.

Embodiment 157. The edible formulation of Embodiment 153, wherein the total concentration of the sweetener, the at least one fat, and the at least one starch within the edible formulation is at least 50%.

Embodiment 158. The edible formulation of Embodiment 153, wherein the total concentration of the sweetener, the at least one fat, and the at least one starch within the edible formulation is at least 55%.

Embodiment 159. The edible formulation of Embodiment 153, wherein the total concentration of the sweetener, the at least one fat, and the at least one starch within the edible formulation is at least 60%.

Embodiment 160. The edible formulation of any one of Embodiments 87 to 153, wherein the total concentration of the sweetener, the at least one fat, the at least one starch, and a or the edible filler within the edible formulation is at least 50%, on a weight basis.

Embodiment 161. The edible formulation of Embodiment 148, wherein the total concentration of the sweetener, the at least one fat, the at least one starch, and the edible filler within the edible formulation is at least 55%.

Embodiment 162. The edible formulation of Embodiment 148, wherein the total concentration of the sweetener, the at least one fat, the at least one starch, and the edible filler within the edible formulation is at least 60%.

Embodiment 163. The edible formulation of Embodiment 148, wherein the total concentration of the sweetener, the at least one fat, the at least one starch, and the edible filler within the edible formulation is at least 65%.

Embodiment 164. The edible formulation of Embodiment 148, wherein the total concentration of the sweetener, the at least one fat, the at least one starch, and the edible filler within the edible formulation is at least 70%.

Embodiment 165. The edible formulation of Embodiment 148, wherein the total concentration of the sweetener, the at least one fat, the at least one starch, and the edible filler within the edible formulation is at least 75%.

Embodiment 166. The edible formulation of any one of Embodiments 87 to 165, wherein a concentration of cocoa powder within the edible formulation is at least 2%.

Embodiment 167. The edible formulation of Embodiment 166, wherein the concentration of cocoa powder is at least 3%.

Embodiment 168. The edible formulation of Embodiment 166, wherein the concentration of cocoa powder is at least 5%.

Embodiment 169. The edible formulation of any one of Embodiments 83 to 168, containing at least 5% of the sweetener, at least 5% of the at least one fat, and at least 5% of the at least one starch.

Embodiment 170. The edible formulation of Embodiment 169, containing at least 2% of a or the edible filler.

Embodiment 171. The edible formulation of Embodiment 169 or Embodiment 170, containing at least 10% of the sweetener, at least 10% of the at least one fat, and at least 10% of the at least one starch.

Embodiment 172. The edible formulation of any one of Embodiments 169 to 171, containing at least 5% of a or the edible filler.

Embodiment 173. The edible formulation of Embodiment 172, containing at least 8% of the edible filler.

Embodiment 174. The formulation of any one of Embodiments 87 to 173, the formulation further including any structural limitation or combination of structural limitations in Embodiments 1 to 86.

Embodiment 175. The method or formulation of any one of the preceding Embodiments, wherein the sweetener carbohydrate is selected from at least one of the group consisting of sucrose, glucose, fructose, maltose, lactose, mannose, allulose, tagatose, xylose, galactose, arabinose, galactofructose.

Embodiment 176. The method or formulation of any one of the preceding Embodiments, wherein the sweetener carbohydrate includes sucrose.

Embodiment 177. The method or formulation of any one of the preceding Embodiments, wherein the sweetener carbohydrate predominantly includes sucrose.

Embodiment 178. The method or formulation of any one of the preceding Embodiments, wherein the sweetener carbohydrate includes or mainly includes glucose.

Embodiment 179. The method or formulation of any one of the preceding Embodiments, wherein the sweetener carbohydrate includes or mainly includes fructose.

Embodiment 180. The method or formulation of any one of the preceding Embodiments, wherein the sweetener polyol is a sugar alcohol.

Embodiment 181. The method or formulation of any one of the preceding Embodiments, wherein the sweetener polyol is selected from at least one of the group consisting of xylitol, maltitol, erythritol, sorbitol, threitol, arabitol, hydrogenated starch hydrolysates (HSH), isomalt, lactitol, mannitol, and galactitol (dulcitol).

Average molecular weight may be calculated based on the number of particles in the population ("$D_N50$") or may be based on the volume of particles ($D_V50$). These measurements may be obtained by various known methods (e.g., DLS, microscopy).

Average particle size (D50) is based on at least one of the particle number-averaged size of particles in the population ("$D_N50$") and the particle volume averaged size of particles in the population ("$D_V50$"). These measurements may be obtained by various known methods including static light scattering (SLS), dynamic light scattering (DLS), sieving, and various methods of microscopy. Some methods may be preferred for larger ranges of particles, others may be preferred for smaller ranges of particles, as will be appreciated by those of skill in the art.

As used herein in the specification and in the claims section that follows, the term "average concentration", and the like, with respect to a silica component or to a sweetener within a particular kernel, coating, core, shell, particle, and the like, or with respect to a plurality of such kernels, coatings, cores, shells, particles, and the like, refers to the total weight of that particular component divided by the total weight of the silica and sweetener within said particular kernel, coating, core, shell, particle, and the like, or within said plurality of such kernels, coatings, cores, shells, particles, and the like. For the avoidance of doubt, calculations of the "average concentration" of silica have been exemplified hereinabove.

In addition to including fats that are solid at room temperature (25° C.), e.g., beef fat, shortening, palm oil, and butter, as used herein in the specification and in the claims section that follows, the term "fat" is meant to include edible oils, including those that are liquid at room temperature, e.g., cooking oils. Specific examples of edible oils are olive oil, walnut oil, corn oil, and cottonseed oil.

Fats may be a separate ingredient, or may be an ingredient within a food ingredient. For example, hazelnut paste and cocoa powder both contain fat.

As used herein in the specification and in the claims section that follows, the term "percent", or "%", refers to percent by weight, unless specifically indicated otherwise. However, with specific regard to formulations containing silica and sweetener, the weight-percent of the silica, or average weight-percent of the silica, may be with respect to the sweetener, on a dry basis, in the sweetener, in the coated particles, or in the coating. By way of example, in a 700 gram formulation containing 50 grams of coated particles containing 2.5 grams silica and further containing 650 grams of ordinary table sugar, the weight-percent of the silica is 2.5/697.5=0.358%, with respect to the sweetener (sugar), and 2.5/700=0.357%, with respect to the entire formulation.

As used herein in the specification and in the claims section that follows, the term "concentration" refers to concentration on a weight basis, unless specifically indicated otherwise.

The term "ratio", as used herein in the specification and in the claims section that follows, refers to a weight ratio, unless specifically indicated otherwise.

The modifier "about" and "substantially" used in connection with a quantity is inclusive of the stated value and has the meaning dictated by the context (for example, it includes at least the degree of error associated with the measurement of the particular quantity). When used with a specific value, it should also be considered as disclosing that value.

As used herein in the specification and in the claims section that follows, the term "predominant", "predominantly", and the like, with respect to a sweetener, refers to the sweetener having the highest concentration, by weight. In the context of the present application and claims, the phrase "at least one of A and B" is equivalent to an inclusive "or", and includes any one of "only A", "only B", or "A and B". Similarly, the phrase "at least one of A, B, and C" is equivalent to an inclusive "or", and includes any one of "only A", "only B", "only C", "A and B", "A and C", "B and C", or "A and B and C".

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method comprising:

(a) providing a slurry containing solids disposed in an aqueous medium containing dissolved sugar, said solids including silica particles and sugar kernel particles; and (b) drying at least a portion of said solids to produce a dried sugar product containing coated sugar particles having a silica-and-sugar coating enveloping said sugar kernel particles;

wherein said sugar kernel particles have an average particle size (D50) within the range of 50 to 1500μ;

wherein $C_{SIL\text{-}coating}$ is a first average concentration of said silica particles disposed in an outermost layer of said coated sugar particles;

wherein $C_{SIL\text{-}kernel}$ is a second average concentration of said silica particles disposed in said coated sugar particles, radially inward with respect to said outermost layer;

and wherein the ratio of $C_{SIL\text{-}kernel}$ to $C_{SIL\text{-}coating}$ is at most 0.02.

2. The method of claim 1, further comprising, prior to said drying:

separating off a first portion of said aqueous medium and a first portion of said silica particles from said sugar kernel particles.

3. The method of claim 2, further comprising, prior to said drying:

depositing at least a portion of said dissolved sugar in said aqueous medium onto said sugar kernel particles to produce a sugar coating enveloping said sugar kernel particles, said sugar coating including at least a portion of said silica particles.

4. The method of claim 3, further comprising, following said depositing:

separating off a first portion of said aqueous medium and a first portion of said silica particles from said sugar kernel particles, thereby leaving said at least a portion of said solids as a wet cake in which a second portion of said aqueous medium and a second portion of said silica particles are disposed around said sugar kernel particles.

5. The method of claim 4, wherein said depositing includes crystallizing.

6. The method of claim 5, wherein at least a portion of said crystallizing is performed by cooling crystallization.

7. The method of claim 5, wherein at least a portion of said crystallizing is performed by evaporative crystallization.

8. The method of claim 4, further comprising diluting the silica concentration of the dried sugar product with sucrose, to produce a diluted silica-containing sugar product.

9. The method of claim 8, wherein said sugar kernel particles are sucrose.

10. The method of claim 1, further comprising contacting a plurality of sweetener particles with an aqueous medium containing said dissolved sweetener and said silica particles, to produce said slurry.

11. The method of claim 1, wherein the weight ratio of said sugar kernel particles to said dried sugar product is within the range of 55% to 98%.

12. The method of claim 1, wherein the weight ratio of said silica particles to said dried sugar product is within the range of 0.02% to 5%.

13. The method of claim 1, wherein the dried sugar product is in the form of a free-flowing powder.

14. An edible formulation comprising:

coated sugar particles, each sugar particle of at least a portion of said sugar particles having:

(a) a sugar core;

(b) a sugar shell at least partially enveloping said sugar core; and (c) silica particles disposed at least within said sugar shell;

wherein the first concentration or average concentration of said silica particles within said sugar shell is $C_{SIL\text{-}shell}$;

wherein the second concentration or average concentration of said silica particles within said sugar core is $C_{SIL\text{-}core}$;

wherein $C_{SIL\text{-}shell} > C_{SIL\text{-}core}$;

and wherein $C_{SIL\text{-}core}/C_{SIL\text{-}shell}$ is at most 0.4.

15. The edible formulation of claim 14, further comprising: at least one fat; optionally, at least one starch; and (d) optionally, at least one edible filler.

16. The edible formulation of claim 15, wherein the weight content of said sugar is within the range of 8% to 80%.

17. The edible formulation of claim 16, wherein a weight-to-weight ratio of said silica to said sugar within said sugar particles is optionally within the range of 0.02% to 1.5%;

and wherein a total concentration of said sugar, said at least fat, and said at least one starch, within the edible formulation, is at least 30%, on a weight basis.

18. The edible formulation of claim 17, the edible formulation further comprising said edible filler.

19. The edible formulation of claim 18, wherein said concentration of said edible filler is within the range of 3% to 35%.

20. The edible formulation of claim 19, containing at least 10% of said sweetener, at least 10% of said at least one fat, and at least 10% of said at least one starch.

* * * * *